(12) United States Patent
Shimanouchi et al.

(10) Patent No.: US 6,992,878 B2
(45) Date of Patent: Jan. 31, 2006

(54) TUNABLE CAPACITOR AND METHOD OF FABRICATING THE SAME

(75) Inventors: Takeaki Shimanouchi, Kawasaki (JP); Masahiko Imai, Kawasaki (JP); Tadashi Nakatani, Kawasaki (JP); Tsutomu Miyashita, Kawasaki (JP); Yoshio Sato, Kawasaki (JP)

(73) Assignees: Fujitsu Limited, Kawasaki (JP); Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 10/392,855

(22) Filed: Mar. 21, 2003

(65) Prior Publication Data

US 2003/0179535 A1 Sep. 25, 2003

(30) Foreign Application Priority Data

| Mar. 25, 2002 | (JP) | ................................. | 2002-084600 |
| Sep. 4, 2002 | (JP) | ................................. | 2002-258559 |

(51) Int. Cl.
  *H01G 7/00* (2006.01)
  *H01G 5/01* (2006.01)
  *H01G 4/00* (2006.01)

(52) U.S. Cl. ..................... 361/280; 361/278; 361/301.2
(58) Field of Classification Search ................ 361/277, 361/278–281, 287, 290, 292, 301.2
See application file for complete search history.

(56) References Cited

U.S. PATENT DOCUMENTS 6,373,682 B1 * 4/2002 Goodwin-Johansson .... 361/278

| 6,376,787 | B1 | * | 4/2002 | Martin et al. | ................ | 200/181 |
| 6,662,029 | B2 | * | 12/2003 | Eden et al. | .................. | 505/210 |
| 6,681,063 | B1 | * | 1/2004 | Kane et al. | .................... | 385/18 |
| 2003/0099082 | A1 | | 5/2003 | Tuo et al. | | |

FOREIGN PATENT DOCUMENTS

| JP | 60121713 | 12/1983 |
| JP | 63-501993 | 11/1986 |
| JP | 04-250611 | 6/1990 |
| JP | 06111971 | 9/1992 |
| JP | 06-086325 | 5/1993 |
| JP | 07-335491 | 6/1994 |
| JP | 08-250779 | 3/1995 |
| JP | 08321640 | 5/1995 |
| JP | 09130199 | 10/1995 |
| JP | 11-513193 | 9/1996 |
| JP | 10-149951 | 11/1996 |
| JP | 11-243032 | 2/1998 |
| WO | WO 01/045119 | 6/2001 |

OTHER PUBLICATIONS

Jan Y. Park et al., "Micromachined RF MEMS Tunable Capacitors Using Piezoelectric Actuators", IEEE International Microwave Symposium, 2002.

Charles L. Goldsmith et al., "RF MEMS Variable Capacitors for Tunable Filters", Wiley RF Microwave Computer Aided Design, 1999, pp. 362–374.

* cited by examiner

*Primary Examiner*—Eric Thomas
(74) *Attorney, Agent, or Firm*—Arent Fox PLLC

(57) ABSTRACT

A tunable capacitor includes a substrate, a stationary electrode and a movable electrode supported by the substrate, piezoelectric actuators that are supported by the substrate and drive the movable electrode, and a dielectric layer interposed between the stationary electrode and the movable electrode.

30 Claims, 34 Drawing Sheets

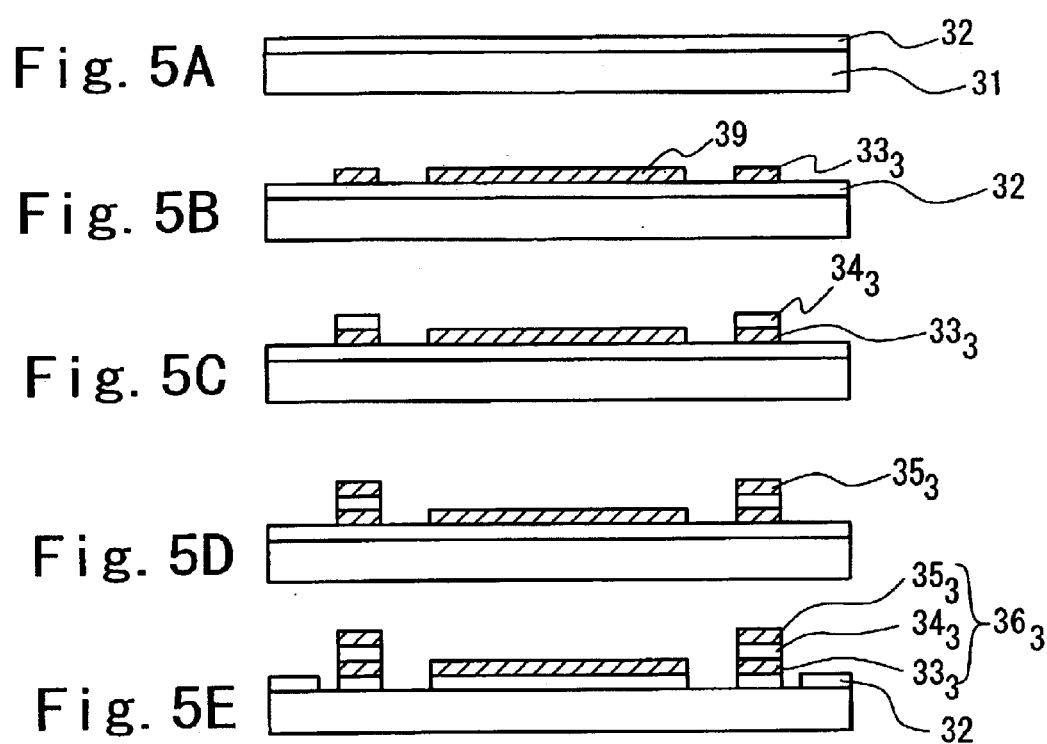

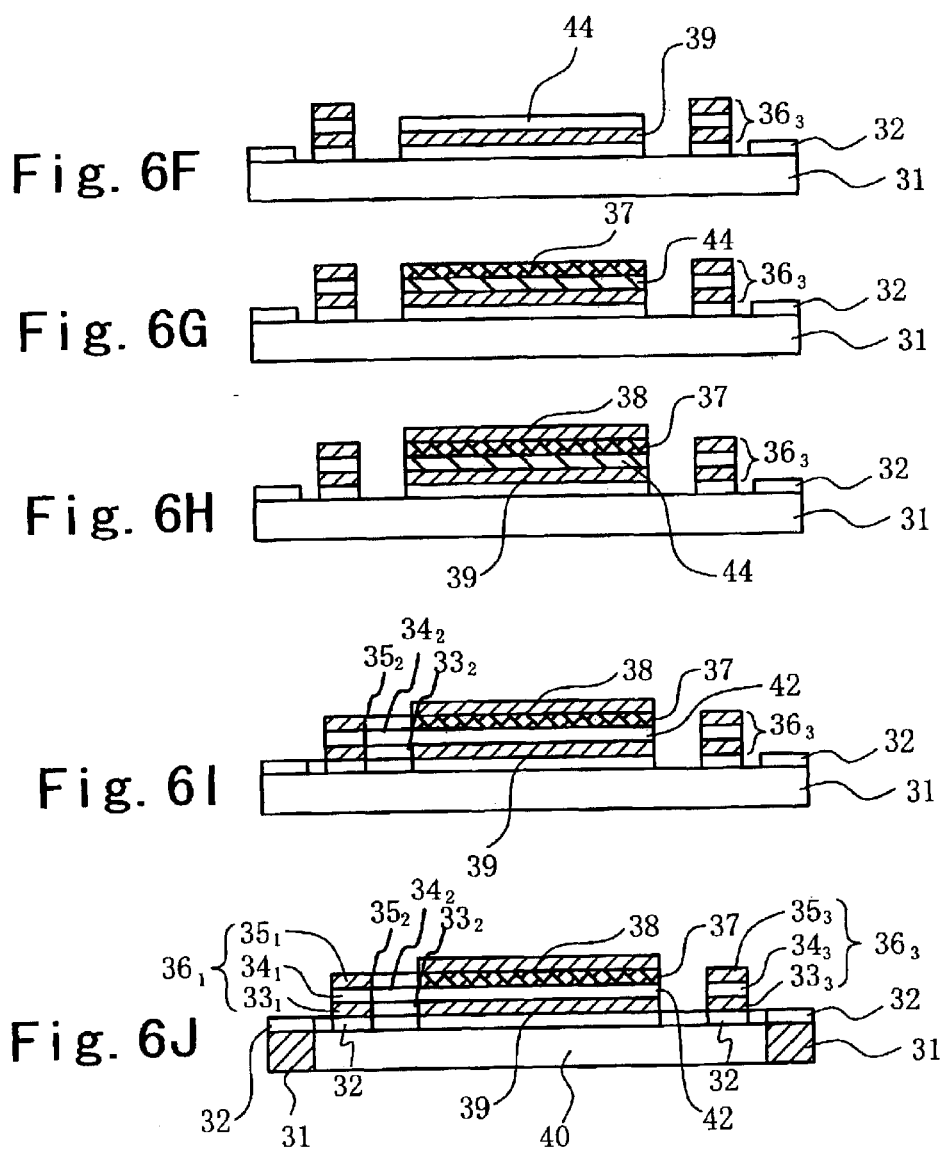

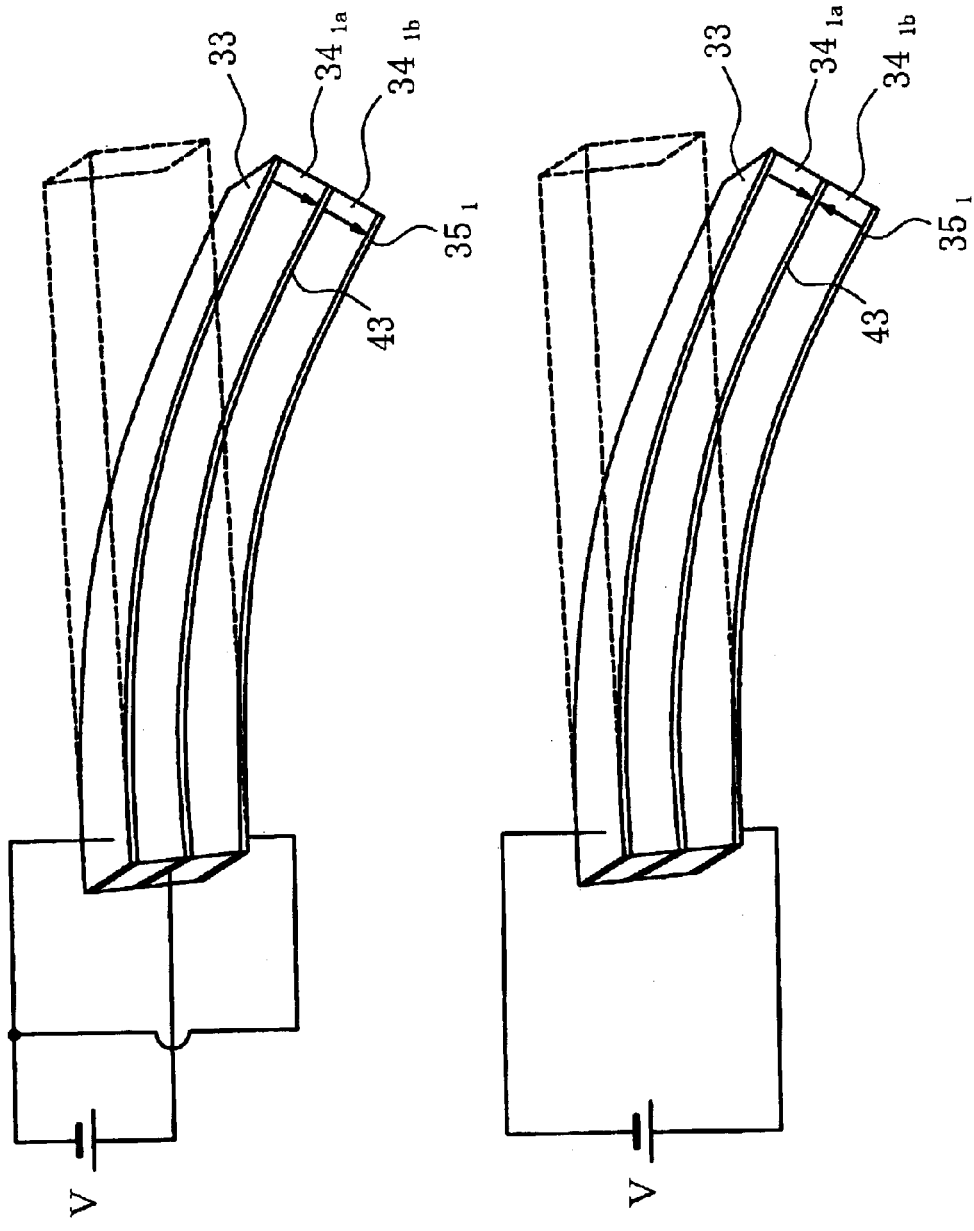

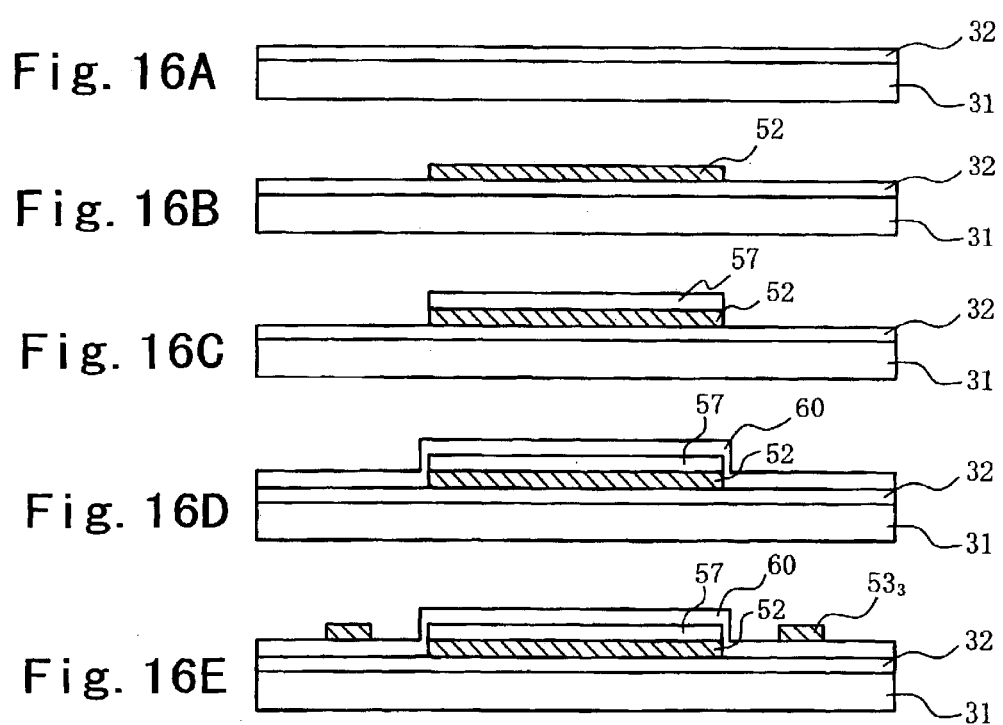

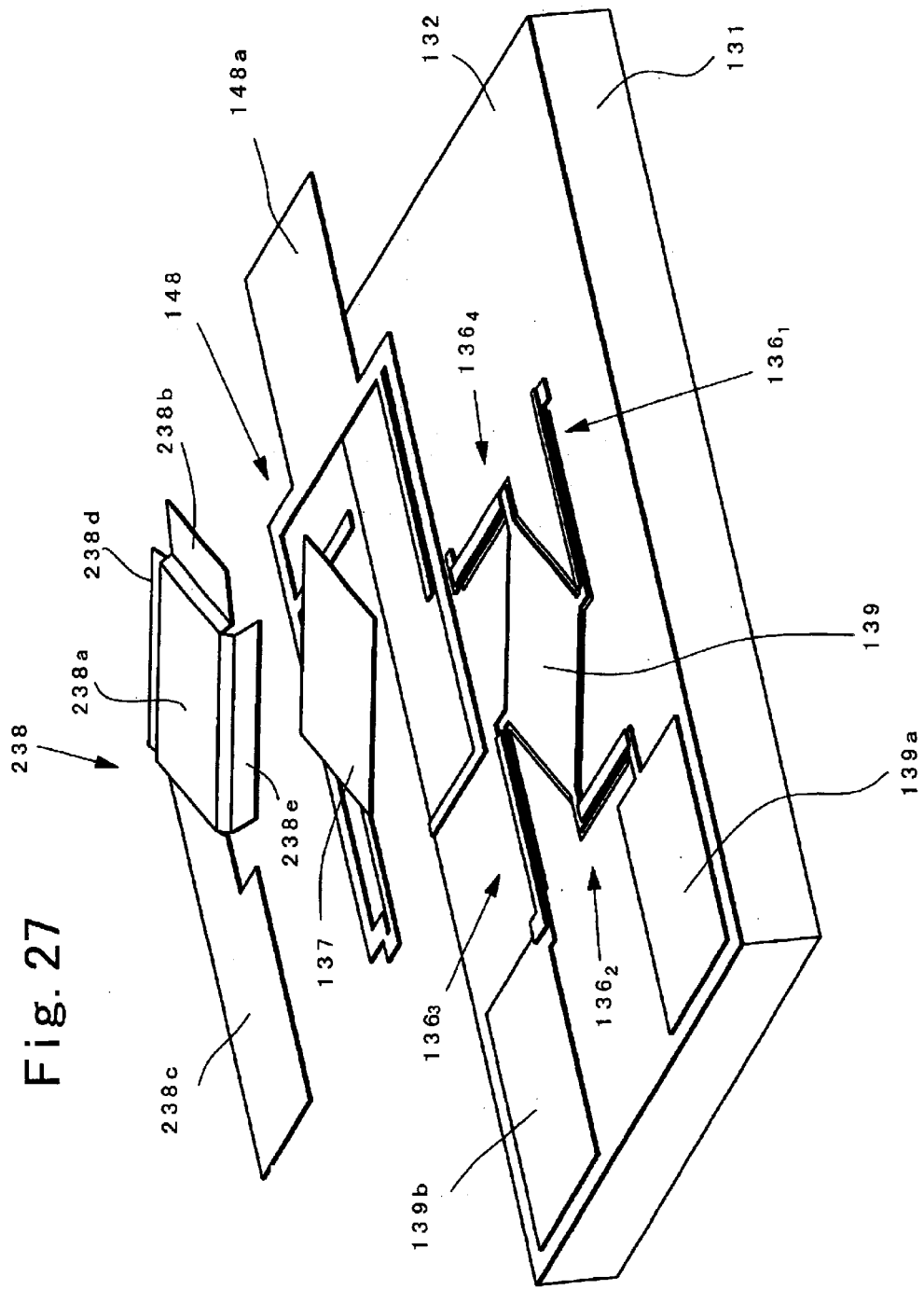

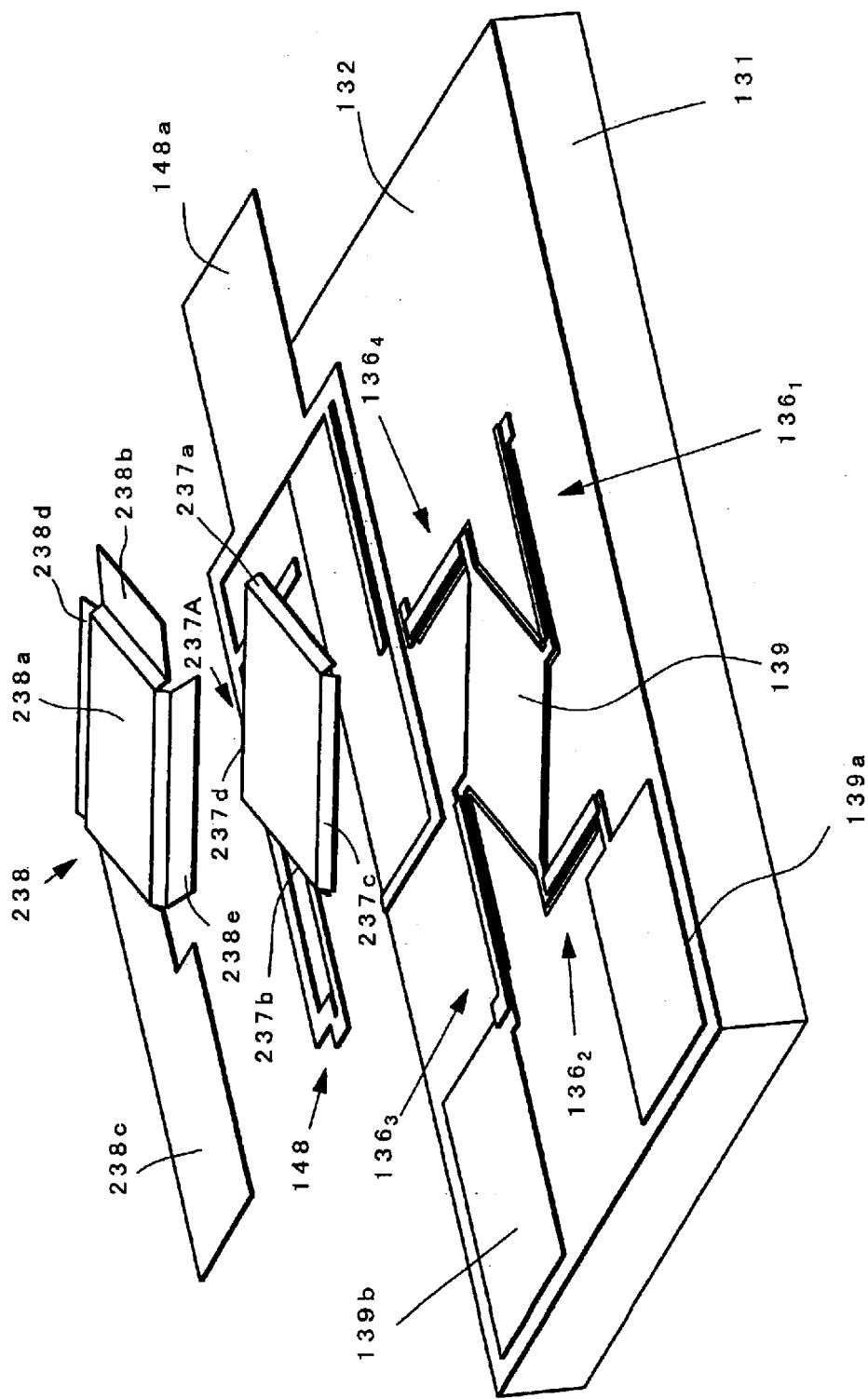

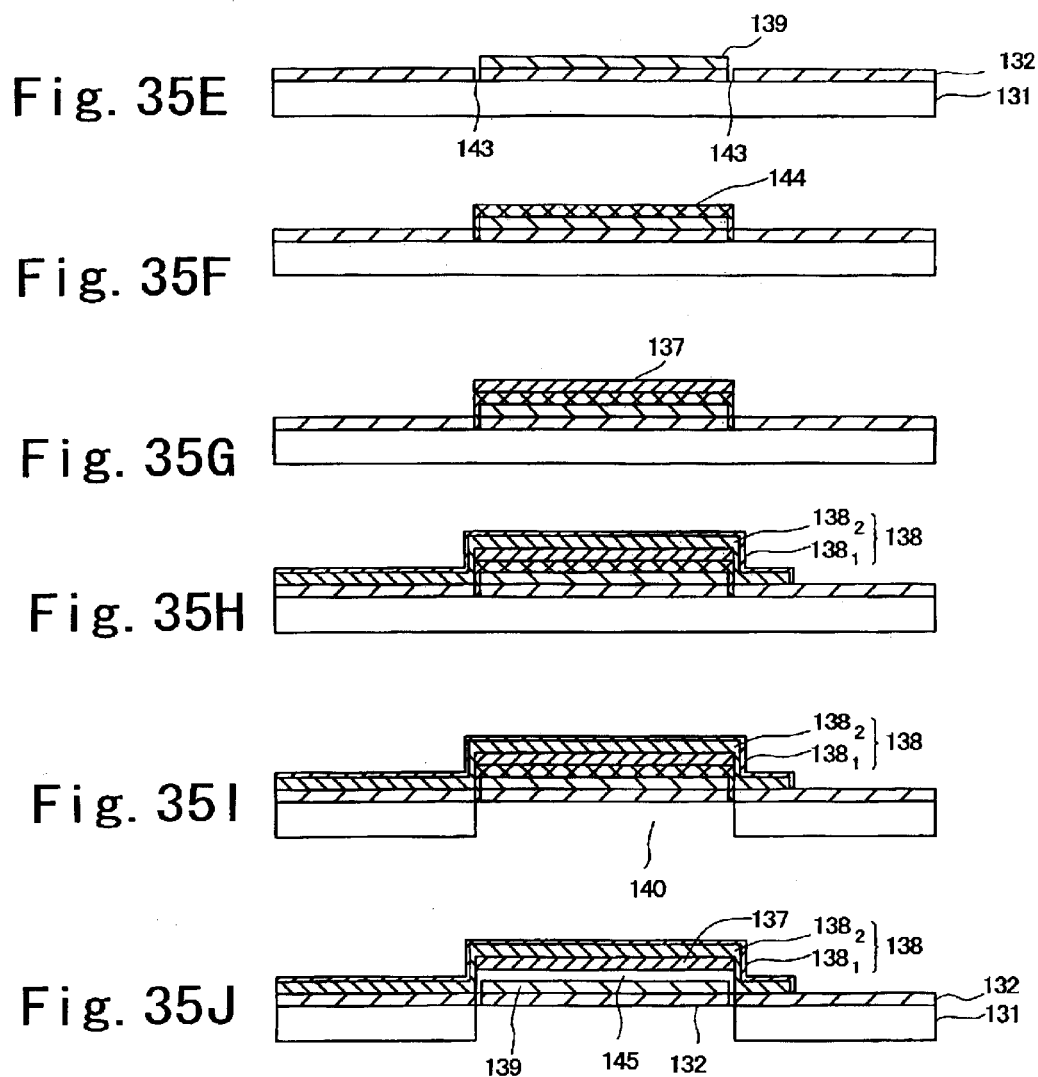

TUNABLE CAPACITOR AND METHOD OF FABRICATING THE SAME

BACKGROUND OF THE INVENTION

1. Field of the Invention

The present invention generally relates to tunable capacitors, and more particularly, to a tunable capacitor using MEMS (microelectromechanical system) techniques and a method of fabricating such a capacitor.

The tunable capacitor is a key component in electrical circuits such as a variable frequency oscillator (VCO), a tunable amplifier, a phase shifter and an impedance matching circuit. Recently, the tunable capacitor has been increasingly applied to cellular phones.

As compared to a varactor diode, which is a kind of tunable capacitors currently used, the MEMS tunable capacitor has advantages of a small loss and a high Q value. Therefore, there has been considerable activity in the development of practical MEMS tunable capacitors.

2. Description of the Related Art

FIG. 1 is a cross-sectional view of a tunable capacitor that is described in Jae Y. Park et al., "MICROMACHINED RF MEMS TUNABLE CAPACITORS USING PIEZOELECTRIC ACTUATORS", IEEE International Microwave Symposium, 2002.

This tunable capacitor includes a movable electrode substrate 11 and a stationary electrode substrate 15. The movable electrode substrate 11 is made up of a unimorph type of piezoelectric actuators 12 and a movable electrode 13. A stationary electrode 16 is provided on the stationary electrode substrate 15. The stationary electrode substrate 11 and the stationary electrode substrate 15 are bonded by solder bumps 14. By driving the piezoelectric actuators 12, the distance of the movable electrode 13 and the stationary electrode 16 is changed, so that the capacitance formed therebetween can be varied.

FIGS. 2A and 2B are cross-sectional views of a tunable capacitor described in Charles L. Goldsmith et al., "RF MEMS Variable Capacitors for Tunable Filters", Wiley RF Microwave Computer Aided Design, 1999, pp. 362–374.

Referring to FIG. 2A, a stationary electrode 20 is provided on an insulation layer on a substrate 17. A dielectric layer 19 covers the stationary electrode 20. Spacers 18 are provided on the insulation film. A membrane movable electrode 21 is supported by the spacers 18 so as to face the stationary electrode 20 and the dielectric layer 19. An electrostatic attraction develops between the movable electrode 21 and the stationary electrode 20 across which a dc voltage is applied. The electrostatic attraction brings the membrane movable electrode 21 into contact with the dielectric layer 19. The electrostatic attraction F that acts to reduce the gap between the parallel plates is expressed:

$$F = \frac{S}{2d^2} \varepsilon_0 \varepsilon_r V^2$$

where S is the area of the plates, d is the distance between the plates, $\varepsilon_0$ is the dielectric constant in vacuum, $\varepsilon_r$ is the relative dielectric constant between the plates, and V is the voltage applied across the plates. In a case where a dielectric layer is interposed between the plates, the following relational expression stands between the relative dielectric constant $\varepsilon_r$ and the distance d:

$$\frac{d}{\varepsilon_r} = \frac{d_{air}}{\varepsilon_{air}} + \frac{d_{dielectric}}{\varepsilon_{dielectric}}$$

where $\varepsilon_{dielectric}$ and $\varepsilon_{air}$ are respectively the relative dielectric constants of the dielectric and air layers, $d_{dielectric}$ and $d_{air}$ are respectively the thicknesses of the dielectric and air layers.

However, the conventional tunable capacitor shown in FIG. 1 has the following disadvantages. There is difficulty in reducing the gap between the movable electrode 13 and the stationary electrode 16 because the gap is defined by the solder bumps 14. This brings about a small initial capacitance of the piezoelectric actuators 12. It is conceivable to increase the degree of distortion of the piezoelectric actuators 12 in order to increase the electrostatic capacitance. However, this attempt reduces the spring performance of the piezoelectric actuators 12. If an external shock is applied to the tunable capacitor at the time of mounting it to an electronic apparatus such as a cellular phone, the movable electrode 13 may be brought into contact with the stationary electrode 16, so that the electrodes 13 and 16 are short-circuited and broken. Thus, the movable electrode 13 cannot be tuned so as to be close to the stationary electrode 16 even by the distortion of the piezoelectric actuators 12, so that a desirable capacitance cannot be obtained.

The conventional tunable capacitance shown in FIGS. 2A and 2B has the following disadvantages. In the case where the dielectric layer is interposed between the parallel plates, a large capacitance can be obtained due to the function of the intervening dielectric layer. However, the relative dielectric constant $\varepsilon_r$ changes as the distance d changes. Thus, it is difficult to control the distance between the parallel plates. It follows that the movable electrode 21 and the dielectric layer 19 can assume only two states, namely, the distant state and the contact state. That is, the tunable capacitor has only two capacitance values. In some cases, multiple tunable capacitors having relatively small capacitance values are connected in parallel in order to secure the target capacitance. However, the wiring or interconnection resistance for connecting the multiple tunable capacitors increases, this reducing the Q value (which indicates the insertion loss, and increases as loss deceases).

SUMMARY OF THE INVENTION

The present invention has been made in view of the above circumstances, and has an object of eliminating the above disadvantages.

A more specific object of the present invention is to provide a compact, crushproof tunable capacitor having a wide and finely tunable range and a large Q value, and a method of fabricating the same.

The above objects of the present invention are achieved by a tunable capacitor including: a substrate; a stationary electrode and a movable electrode supported by the substrate; piezoelectric actuators that are supported by the substrate and drive the movable electrode; and a dielectric layer interposed between the stationary electrode and the movable electrode.

The above objects of the present invention are also achieved by a method of fabricating a tunable capacitor comprising the steps of: a) forming a stationary electrode and a movable electrode supported by a substrate; b) forming piezoelectric actuators that are supported by the substrate and drive the movable electrode; c) forming a dielectric layer interposed between the stationary electrode and the movable electrode; d) forming a sacrificial layer in order to form a gap between the dielectric layer and one of the stationary electrode and the movable electrode; and e) removing the sacrificial layer.

BRIEF DESCRIPTION OF THE DRAWINGS

Other objects, features and advantages of the present invention will become more apparent from the following detailed description when read in conjunction with the accompanying drawings, in which:

FIGS. 5A, 5B, 5C, 5D and 5E are cross-sectional views showing steps of a method of fabricating the tunable capacitor shown in FIG. 3;

FIGS. 6F, 6G, 6H, 6I and 6J are cross-sectional views showing steps of the method that follow a series of steps of FIGS. 5A–5E;

FIGS. 8A and 8B illustrate a bimorph;

FIGS. 16A, 16B, 16C, 16D and 16E are cross-sectional views showing steps of a method of fabricating the tunable capacitor shown in FIGS. 13 and 14;

FIG. 27 is an exploded perspective view of a tunable capacitor according to a seventh embodiment of the present invention;

FIG. 33 is an exploded perspective of a tunable capacitor according to a ninth embodiment of the present invention;

FIGS. 35E, 35F, 35G, 35H, 35I and 35J are cross-sectional views of a series of steps of a method of fabricating the tunable capacitor shown in FIG. 34.

DESCRIPTION OF THE PREFERRED EMBODIMENTS

A description will now be given of embodiments of the present invention with reference to the accompanying drawings.

First Embodiment

Figure 1:
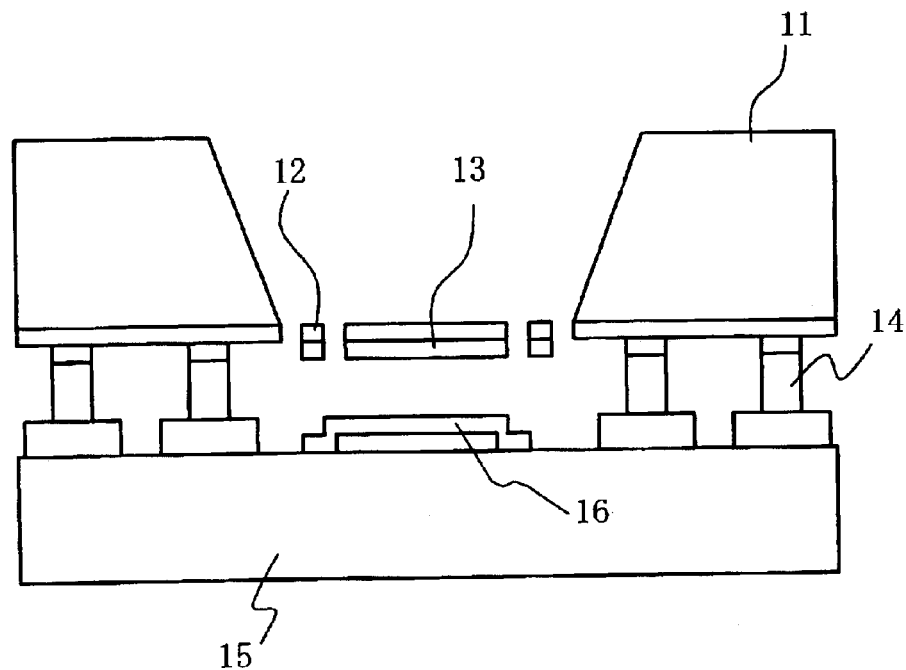
FIG. 1 is a cross-sectional view of a conventional tunable capacitor.
Figure 2A:
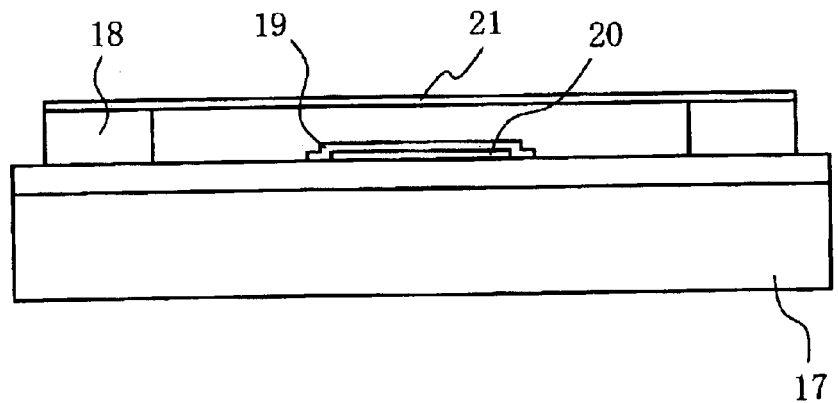
FIGS. 2A and 2B are cross-sectional views of another conventional tunable capacitor.
Figure 2B:
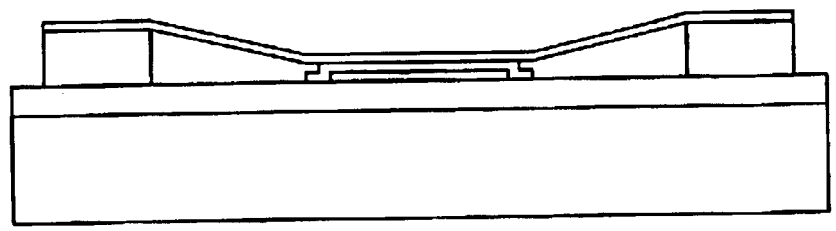
Figure 3:
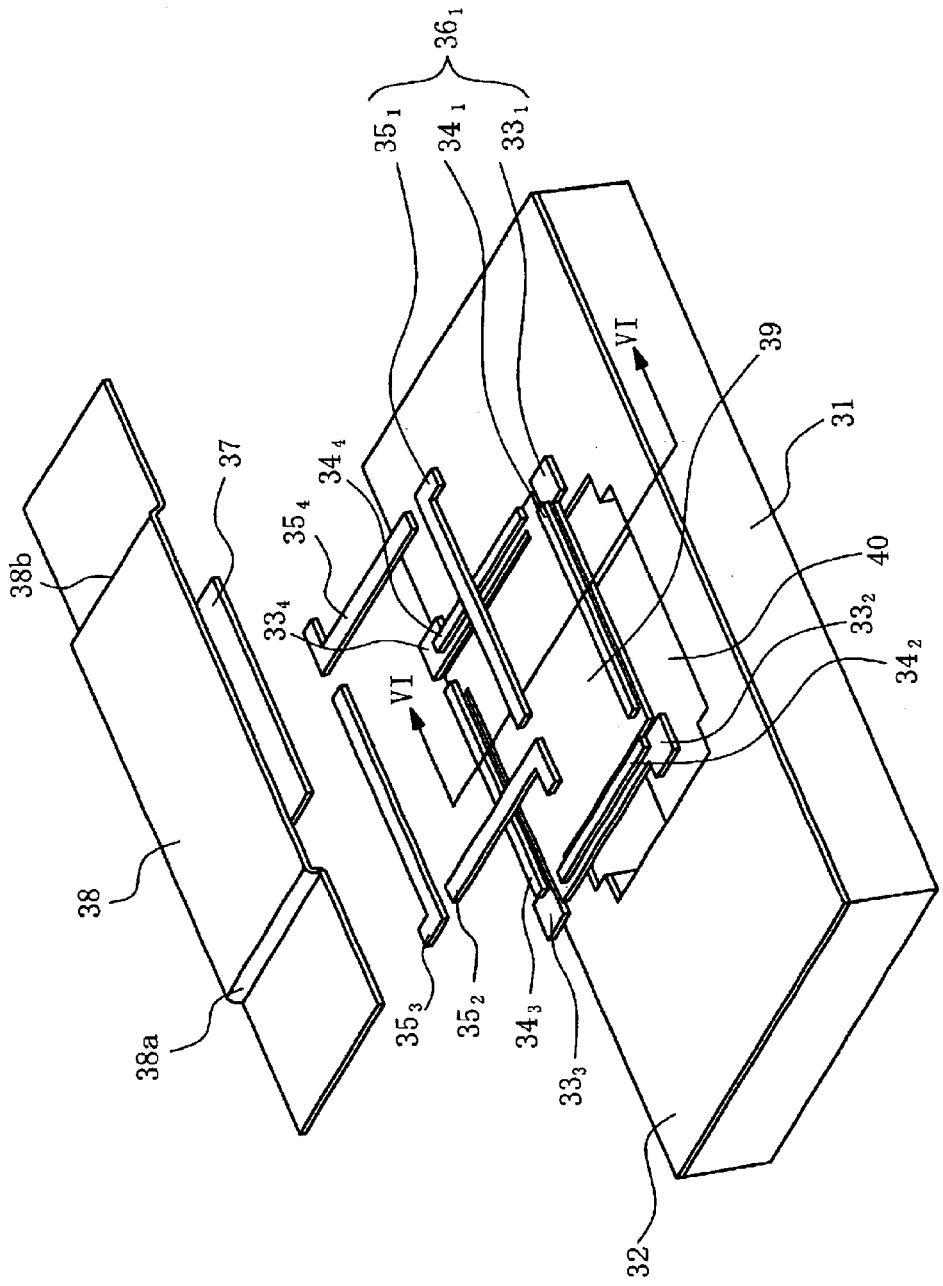
FIG. 3 is an exploded perspective view of a tunable capacitor according to a first embodiment of the present invention.

FIG. 3 is an exploded perspective view of a tunable capacitor according to a first embodiment of the present invention. An insulation layer 32 is provided on a substrate 31, which may be made of, for example, silicon or a compound semiconductor. An opening 40 is formed in the center of the substrate 31. The opening 40 is also formed in the insulation layer 32 so as to be penetrated through the substrate 31 and the insulation layer 32. A capacitor includes a stationary electrode 38, a movable electrode 39 and a dielectric layer 37 supported by the stationary electrode 38. The movable electrode 39 is driven by four piezoelectric actuators. In FIG. 3, only one of the four piezoelectric actuators is assigned a reference numeral $36_1$. The piezoelectric actuator $36_1$ includes a lower drive electrode $33_1$, a piezoelectric element $34_1$ and an upper drive electrode $35_1$. The lower drive electrode $33_1$ and the upper drive electrode $35_1$ are paired and the piezoelectric element $34_1$ is interposed therebetween so that these components are incorporated. The other piezoelectric actuators are configured as mentioned above. In the present specification, the piezoelectric actuators $36_1$–$36_4$ may be referred to as a piezoelectric actuator as a whole. In such a case, the individual piezoelectric actuators $36_1$–$36_4$ may be referred to as drive elements.

Figure 4A:
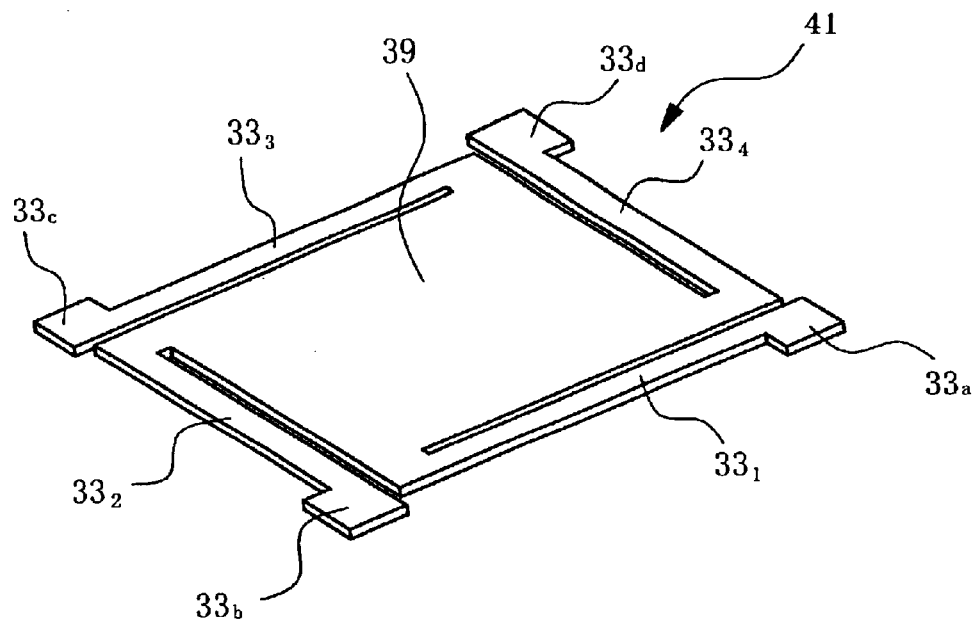
FIG. 4A is a perspective view of a common electrode used in the first embodiment of the present invention.
Figure 4B:
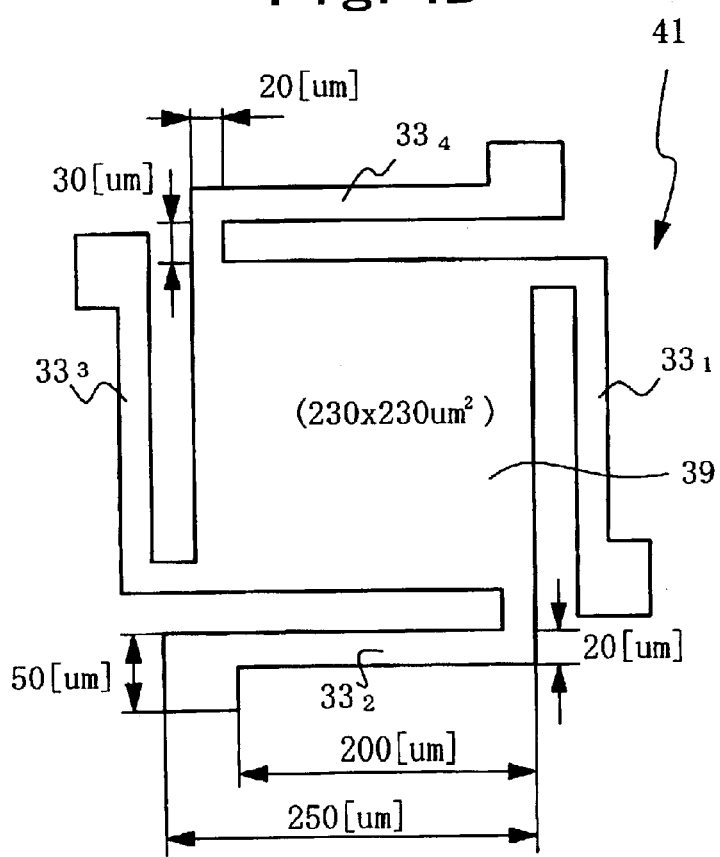
FIG. 4B is a plan view of the common electrode shown in FIG. 4A.

As shown in FIG. 4, the lower drive electrodes $33_1$, $33_2$, $33_3$ and $33_4$ of the four piezoelectric actuators $36_1$, $36_2$, $36_3$ and $36_4$ and the movable electrode 39 are formed by a common electrode 41 of a single piece. In other words, the lower drive electrodes $33_1$, $33_2$, $33_3$ and $33_4$ and the movable electrode 39 are integrally formed. The drive electrodes $33_1$, $33_2$, $33_3$ and $33_4$ are commonly connected via the movable electrode 39, and are provided with pads or lands 33a, 33b, 33c and 33d located on the respective ends. The pads 33a–33d are provided on the insulation film 32 on the substrate 31. The pads 33a–33d may be connected to interconnection lines for making external connections or extraction electrodes or lines on the insulation layer 32. The lower drive electrodes $33_1$, $33_2$, $33_3$ and $33_4$ and the movable electrode 39 are located above the opening 40 formed in the substrate 31 and the insulation layer 32. As will be described later in connection with a fabrication method, an insulation film is provided on the backside of the common electrode 41.

Rectangular piezoelectric elements $34_1$, $34_2$, $34_3$ and $34_4$ are respectively provided on the lower drive electrodes $33_1$, $33_2$, $33_3$ and $33_4$. The piezoelectric elements $34_1$, $34_2$, $34_3$ and $34_4$ may be made of a PZT (Lead Zirconate Titanate)-based piezoelectric substance, and has a characteristic of expanding and contracting in a direction orthogonal to the electric field for driving. Upper drive electrodes $35_1$, $35_2$, $35_3$ and $35_4$, which are separately provided, are provided on the piezoelectric elements $34_1$, $34_2$, $34_3$ and $34_4$, respectively. When voltages are applied across the lower electrodes $33_1$, $33_2$, $33_3$ and $33_4$ and the upper electrodes $35_1$, $35_2$, $35_3$ and $35_4$, the piezoelectric elements $34_1$, $34_2$, $34_3$ and $34_4$ are morphed so that the movable electrode 39 can move in the direction substantially perpendicular to the substrate 31.

As is shown in FIG. 3, the stationary electrode 38 has two bent portions 38a and 38b so that the intervening portion of the stationary electrode 38 brides over the movable electrode 39. Both sides of the stationary electrode 38 are provided on the insulation layer 32. The dielectric layer 37 is attached to the inner surface of the stationary electrode 38 interposed between the bent portions 38a and 38b. The dielectric layer 37 has a size that is smaller than a spacing surrounded by the upper drive electrodes $35_1$, $35_2$, $35_3$ and $35_4$. A flat plate-like member may form the stationary electrode 38. In this case, two spacers may be provided on the insulation layer 32 in the longitudinal direction of the substrate 31 so as to sandwich the movable electrode 39. The flat plate-like member of the stationary electrode 38 is mounted on the spacers.

FIG. 6J is a cross-sectional view taken along a line VI—VI shown in FIG. 3. It will be noted that FIGS. 5A through 5E and FIGS. 6F through 6J illustrate a method of fabricating the tunable capacitor shown in FIG. 3. Referring to FIG. 6J, there are illustrated the piezoelectric actuator $36_1$, and the piezoelectric actuator $36_3$ made up of the lower drive electrode $33_3$, the piezoelectric element $34_3$ and the upper drive electrode $35_3$. The piezoelectric actuators $36_1$ and $36_3$ and the movable electrode 39 stand on their own above the opening 40 formed in the substrate 31. The other piezoelectric actuators $36_2$ and $36_4$ are configured as the actuators $36_1$ and $36_3$. The dielectric layer 37 supported by the stationary substrate 38 is located within the spacing surrounded by the four piezoelectric actuators $36_1$ through $36_4$, and face the movable electrode 39 via a gap 42. By driving the piezoelectric actuators $36_1$ through $36_4$, the movable electrode 39 can be distorted from the state shown in FIG. 6J to another state in which the movable electrode 39 contacts the dielectric layer 37. This distortion changes the distance between the stationary electrode 38 and the movable electrode 39, and thus changes the capacitance. Since the dielectric layer 37 is interposed between the stationary electrode 38 and the movable electrode 39, the dielectric constant also changes, so that the capacitance between the stationary electrode 38 and the movable electrode 39 can be changed greatly.

Figure 7:
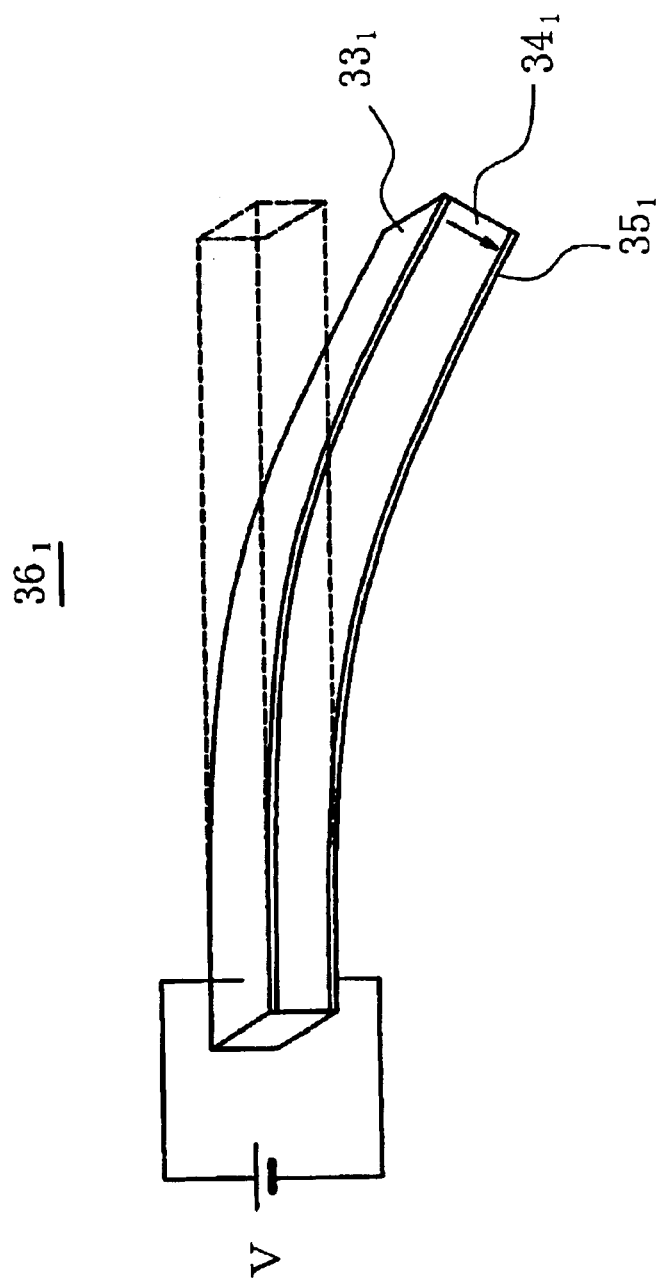
FIG. 7 illustrates a unimorph.

FIG. 7 is a diagram illustrating an operation of the piezoelectric actuator $36_1$. The piezoelectric actuator $36_1$ is a unimorph composed of the lower drive electrode $33_1$, the piezoelectric element $34_1$ and the upper drive electrode $35_1$. The piezoelectric element $34_1$ is polarized in the direction indicated by an arrow. The piezoelectric element $34_1$ is like a cantilever. A dc voltage V is applied across the lower drive electrode $33_1$ and the upper drive electrode $35_1$, the portion of the piezoelectric element $34_1$ on the stationary electrode 38 contracts in the direction of the piezoelectric constant d31, and the other portion expands. Thus, the piezoelectric actuator $36_1$ is deformed as shown in FIG. 7. When the dc voltage is applied on the pad 33a side of the piezoelectric actuator $36_1$ shown in FIG. 4, the other side thereof (on which side the lower drive electrode $33_1$ is connected to the movable electrode 39) is raised, and the movable electrode 39 integrally formed with the lower drive electrode $33_1$ moves toward the dielectric layer 37. Similarly, the other piezoelectric actuators $36_2$–$36_4$ raise the movable electrode 39. Thus, the movable electrode 39 becomes close to the dielectric layer 37. Thus, the gap can be controlled, so that the capacitance can be adjusted. Even when the piezoelectric actuators $36_1$–$36_4$ are distorted so as to bring the movable electrode 39 into contact with the dielectric layer 37, the upper drive electrodes $35_1$–$35_4$ does not contact the stationary electrode 38.

Any of the following conditions should be satisfied in order to realize the above-mentioned operation by means of the structure shown in FIG. 7. The lower drive electrode $33_1$ and the upper drive electrode 35 are made of different materials. More particularly, the lower drive electrode $33_1$ is made of a material having a Young's modulus smaller than that of the upper drive electrode $35_1$. For instance, the lower drive electrode $33_1$ is made of a metal containing platinum and the upper drive electrode $35_1$ is made of ruthenium oxide ($RuO_2$). In case the lower drive electrode $33_1$ and the upper drive electrode $35_1$ are made of the same material, these electrodes are designed to have different thicknesses (the lower drive electrode $33_1$ is thicker than the upper drive electrode $35_1$). For instance, the lower drive electrode $33_1$ is designed to have a thickness equal to two to five times the thickness of the upper drive electrode $35_1$. Besides the above means, a layer different from the drive electrode is added to either the lower drive electrode $33_1$ or the upper drive electrode $35_1$. For example, an insulation film is added to the lower drive electrode $33_1$. This means may be used together with the aforementioned means. As will be described later, according to the first embodiment of the present invention, the lower drive electrode $33_1$ is formed on the insulation film 32 and is a laminate of platinum/tantalum (Pt/Ta) or platinum/titanium (Pt/Ti), while the upper drive electrode $35_1$ is made of ruthenium oxide.

The piezoelectric actuators $36_1$–$36_4$ are not limited to the unimorph, but may be a parallel connection bimorph shown in FIG. 8A or a series-connection bimorph shown in FIG. 8B. In FIGS. 8A and 8B, piezoelectric elements $34_{1a}$ and $34_{1b}$ are provided so as to sandwich an intervening electrode 43. Each of the piezoelectric elements $34_{1a}$ and $34_{1b}$ are polarized in the directions indicated by arrows. The lower drive electrode $33_1$ is provided to the piezoelectric element $34_{1a}$ and the upper drive electrode $35_1$ is provided to the piezoelectric element $34_{1b}$. When the dc voltage is applied as shown in FIGS. 8A and 8B, the bimorphs are distorted.

Figure 9A:
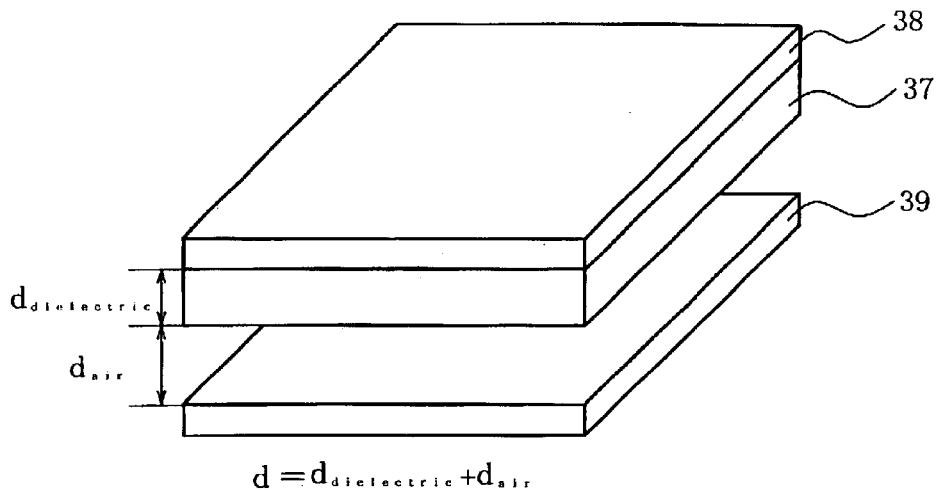
FIGS. 9A and 9B describe effects of the tunable capacitor according to the first embodiment of the present invention.
Figure 9B:
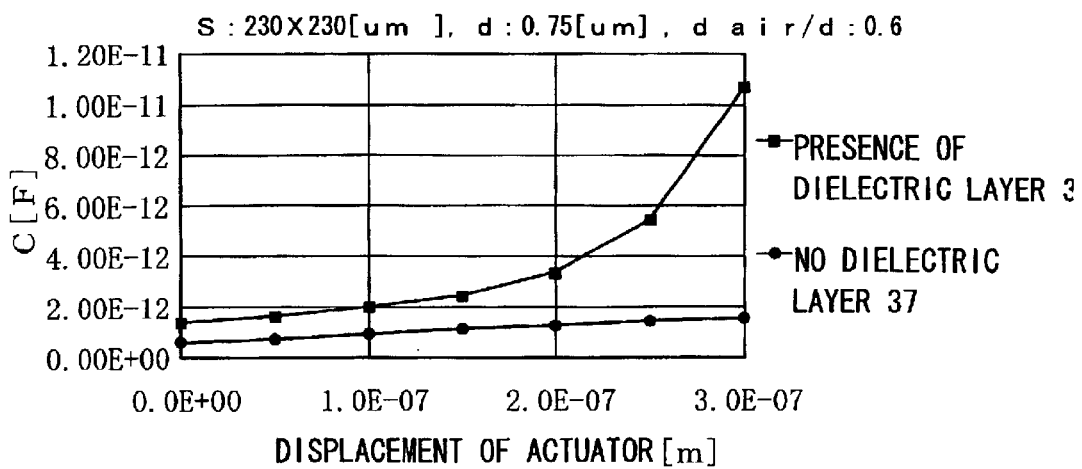

FIGS. 9A and 9B show the effects of the present invention. As shown in FIG. 9A, $d_{dielectric}$ denotes the thickness of the dielectric layer 37, and $d_{air}$ denotes the thickness of the air layer between the dielectric layer 37 and the movable electrode 39. The distance d between the stationary electrode 38 and the movable electrode 39 is $d=d_{dielectric}+d_{air}$. FIG. 9B shows a change of the capacitance C [F] as the function of the thickness $d_{air}$ of the air layer by driving the movable electrode 39. The movable electrode 39 and the stationary electrode 38 have a square shape and an area of 230 $\mu$m×230 $\mu$m. The thickness $d_{air}$ is equal to 0.75 $\mu$m, and $d/d_{air}$ is equal to 0.4. The dielectric layer 37 is made of alumina ($Al_2O_3$: $\in$=10). The movable electrode 39 shown in FIG. 9A is a part of the common electrode 41 of the size shown in FIG. 4B. The piezoelectric actuators $36_1$–$36_4$ are configured as follows. The upper drive electrodes $35_1$–$35_4$ are made of platinum and are 0.5 $\mu$m thick. The piezoelectric elements $34_1$–$34_4$ are made of PZT and are 1.0 $\mu$m thick. The lower drive electrode $33_1$–$33_4$ are made of platinum and are 2.0 $\mu$m thick. The insulation layer 32 is made of $Si_3N_4$, and is 2.0 $\mu$m thick.

A comparative example is used in which the dielectric layer 37 has been removed. A change of the capacitance of the comparative example is shown in FIG. 9B. As is shown in this figure, the tunable capacitor equipped with the dielectric layer 37 has a capacitance of approximately 1.36 pF in the initial state (in which the variable electrode 39 is not distorted), and a capacitance of approximately 10.4 pF in a state in which the movable electrode 39 is in contact with the dielectric layer 37. The ratio of the capacitance between the two states is approximately 7.6 times, and an increased capacitance ΔC is approximately 660%. In contrast, the comparative example has only a small change of capacitance. It can be seen from the above that the tunable capacitor according to the first embodiment of the present invention has an extremely large capacitance and an extremely wide tunable range. Since the variable electrode 39 is controlled by expansion and contraction of the piezoelectric actuators $36_1$–$36_4$, the thickness of the air layer $d_{air}$ can be continuously changed, so that fine adjustment of capacitance can be achieved.

The tunable capacitor according to the present embodiment has the stationary electrode 38, the movable electrode 39 and the piezoelectric actuators $36_1$–$36_4$, which are supported by the single substrate 31. Therefore, the tunable capacitor is compact and less expensive. Since the dielectric layer 37 is supported by the stationary electrode 38, the mass of the movable portion is only the mass of the variable electrode 39. This enhances the shockproof of the tunable capacitor. In addition, the presence of the dielectric layer 37 avoids the possibility of short-circuiting between the movable electrode 39 and the stationary electrode 38, and prevents breakdown of the tunable capacitor.

A description will now be given, with reference to FIGS. 5A through 5E and 6F through 6J, of a method of fabricating the above-mentioned tunable capacitor according to the first embodiment of the present invention. In the following, although attention is paid to the piezoelectric actuator $36_3$ by way of illustration, the other piezoelectric actuators are simultaneously formed. FIGS. 5A through 5E and 6F through 6J are cross-sectional views taken along the line VI—VI shown in FIG. 3.

As shown in FIG. 5A, the insulation layer 32 of low-stress silicon nitride is formed on the substrate 31 made of silicon by LPCV (Low Pressure Chemical Vapor Deposition).

Next, as shown in FIG. 5B, the movable electrode 39 and the lower drive electrode $33_3$, each being a laminate of Pt/TI (platinum/titanium), are photolithographically deposited and patterned on the insulation layer 32 simultaneously. The Pt/Ti layers are 450 $\mu$m (4500 Å) and 50 $\mu$m (500 Å) thick, respectively. Patterning is carried out by RIE (Reactive Ion Etching) using a $Cl_2O_2$-based (chlorine/oxygen) gas. Of course, the other lower drive electrodes $33_1$, $33_2$ and $33_4$ are simultaneously formed and patterned.

Then, as shown in FIG. 5C, the piezoelectric element $34_3$ is deposited by a sputtering, sol-gel, MOCVD (Metalorganic CVD) or laser abrasion process. The piezoelectric element $34_3$ may be made of, for example, lithium niobate, barium titanate, lead titanate, lead zirconate titanate or bismuth titanate. Patterning is carried out by RIE using a $Cl_2O_2$-based gas.

Thereafter, as shown in FIG. 5D, the upper drive electrode $35_3$ made of ruthenium oxide or platinum is deposited and patterned, and is annealed at a temperature of 650–750° C. Then, the insulation layer 32 is patterned. As a result, the unimorph type piezoelectric actuator $36_3$ is formed which is composed of the lower drive electrode $33_3$, the piezoelectric element $34_3$ and the upper drive electrode $35_3$, these layers being formed on the insulation layer 32 in that order. The piezoelectric actuator $36_3$ may be defined so as to include the insulation layer 32, the lower drive electrode $33_3$, the piezoelectric element $34_3$ and the upper drive electrode $35_3$. The annealing process mentioned above may be performed after the piezoelectric element $34_3$ is formed and before the upper drive electrode $35_3$ is formed.

Then, as shown in FIGS. 6F, 6G and 6H, a sacrificial layer 44 made of resist, the dielectric layer 37, and the stationary electrode 38 are formed in turn. Thereafter, the sacrificial layer 44 is removed so that the gap 42 can be defined between the dielectric layer 37 and the movable electrode 39. Preferably, the dielectric layer 37 may be made of, for example, beryllium oxide, aluminum oxide, aluminum nitride, barium titanate, magnesium titanate, titanium oxide, glass or silicon nitride. The resist may be polyimide-based resist (removable by resist removal liquid), a metal oxide such as magnesium oxide (MgO) (removable by aqueous acetic acid), or a metal oxide (removable by hydrofluoric acid) such as PSG (phosphosilicate glass). The sacrificial layer 44 is, for instance, 0.3 $\mu$m thick.

Finally, the substrate 31 in the periphery of the insulation layer 32 below the piezoelectric actuator $36_3$ and the movable electrode 39 is subject to RIE from the bottom side thereof so that the opening 40 can be formed. The tunable capacitor thus formed has the movable electrode 39 and the underlying insulation layer 32 that are supported by the substrate 31 via the piezoelectric actuator $36_3$. When the substrate 31 is made of silicon, the opening 40 can be formed by deep-RIE. In this case, an etching gas of SF6 (sulfur hexafluoride) and the mask for forming the opening 40 is resist. The layers for the piezoelectric actuators are formed on the (100) or (110) surface of the silicon substrate 31, and are anisotropically etched. Etchant is, for example, potassium hydroxide (KOH), and the mask may be made of $SiO_2$, $Si_3N_4$, Cr or Au.

The above-mentioned process forms the sacrificial layer 44 and the stationary electrode 38 after the thermal treatment or annealing at the step of FIG. 5D. It is therefore possible to select materials of the sacrificial layer 44 and the stationary electrode 38 regardless of the conditions for annealing. In the foregoing, the movable electrode 39 and the piezoelectric actuators $36_1$–$36_4$ are simultaneously formed. An alternative process may be used in which only the upper drive electrodes $35_1$–$35_4$ are formed and annealed, and thereafter, the movable electrode made of, for example, Cu or Au is formed. Since the alternative process forms the movable electrode 39 after annealing for the piezoelectric actuators, the wiring resistance can be reduced.

Figure 10F:
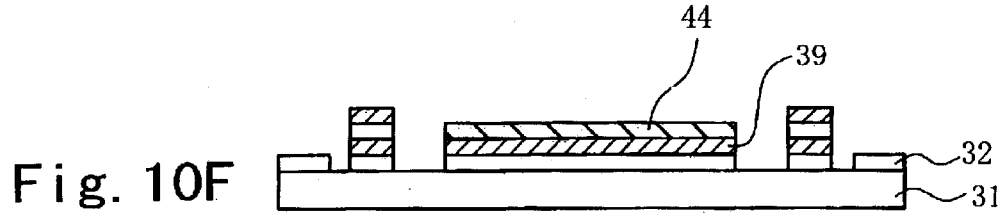
FIGS. 10F, 10G, 10H, 10I and 10J are cross-sectional views of a series of steps of another method of fabricating the tunable capacitor shown in FIG. 3.

FIGS. 10F through 10J show a variation of the above-mentioned fabrication method. This variation is intended to efficiently and effectively remove the sacrificial layer 44. The steps of FIGS. 10F through 10J are substituted for those of FIGS. 6F through 6J, respectively. The step of FIG. 10F follows that of FIG. 5E. As shown in FIG. 10F, the sacrificial layer 44 of resist is deposited on the movable electrode 39.

Figure 10G:
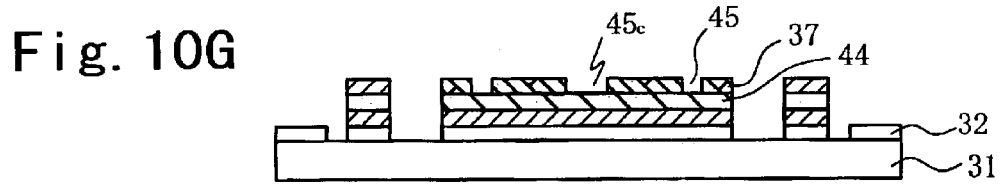

Next, as shown in FIG. 10G, the dielectric layer 37 is formed and multiple etching holes 45 are formed therein. The etching holes 45 is formed in such a manner that a mask is formed on the dielectric layer 37, which is then etched. For example, the etching holes 45 are arranged in matrix formation. The etching holes 45 may have an identical size or different sizes. In the example shown in FIG. 10G, an etching hole 45c located in the center has a larger diameter or size than that of the etching holes in the periphery of the etching hole 45c. A central portion of the sacrificial layer 44 is removed via the etching holes 45. In this case, the etching hole 45c in the center has a comparatively large size, and facilitates removal of the sacrificial layer 44.

Figure 10H:
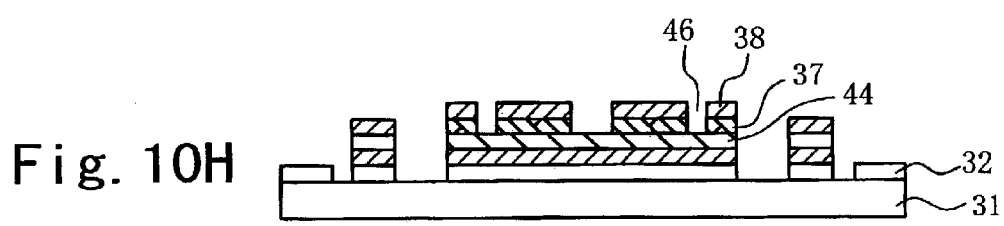
Figure 10I:
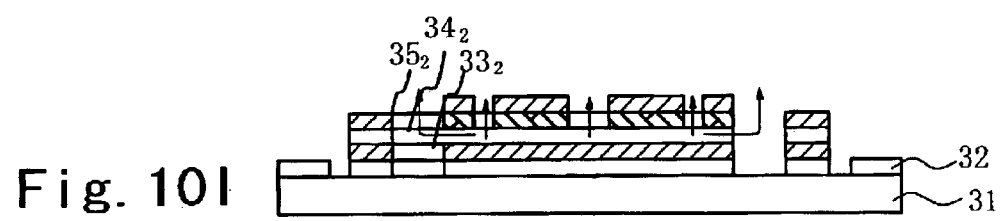

Then, the stationary electrode 39 is formed as shown in FIG. 10H, and etching holes 46 that continue to the etching holes 45 are formed in the stationary electrode 38 using a mask having the same pattern as that of the mask in the process of FIG. 10G. Thereafter, as shown in FIG. 10I, the sacrificial layer 44 is removed. At that time, as indicated by arrows, the sacrificial layer 44 is removed not only along the sides of the stationary electrode 38 but also via the etching holes. It is therefore possible to more efficiently and effectively remove the sacrificial layer 44.

Figure 10J:
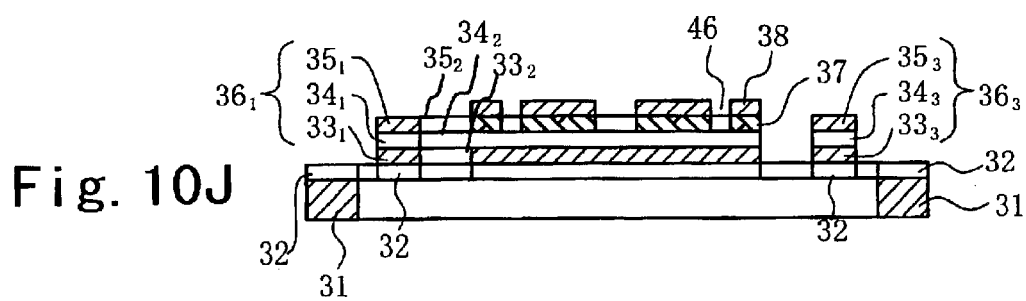

Finally, as shown in FIG. 10J, the substrate 31 in the periphery of the insulation layer 32 below the piezoelectric actuator $36_3$ and the movable electrode 39 is subject to RIE from the bottom side thereof so that the opening 40 can be formed. The tunable capacitor thus formed has the movable electrode 39 and the underlying insulation layer 32 that are supported by the substrate 31 via the piezoelectric actuators $36_1$–$36_4$ (more specifically, the lower movable electrodes $33_1$–$33_4$) wherein the holes that are penetrated through the stationary electrode 38 and the dielectric layer 37 are arranged in rows and columns. The movable electrode 39 is supported by the substrate 31 via the piezoelectric actuators $36_1$–$36_4$.

Second Embodiment

Figure 11:
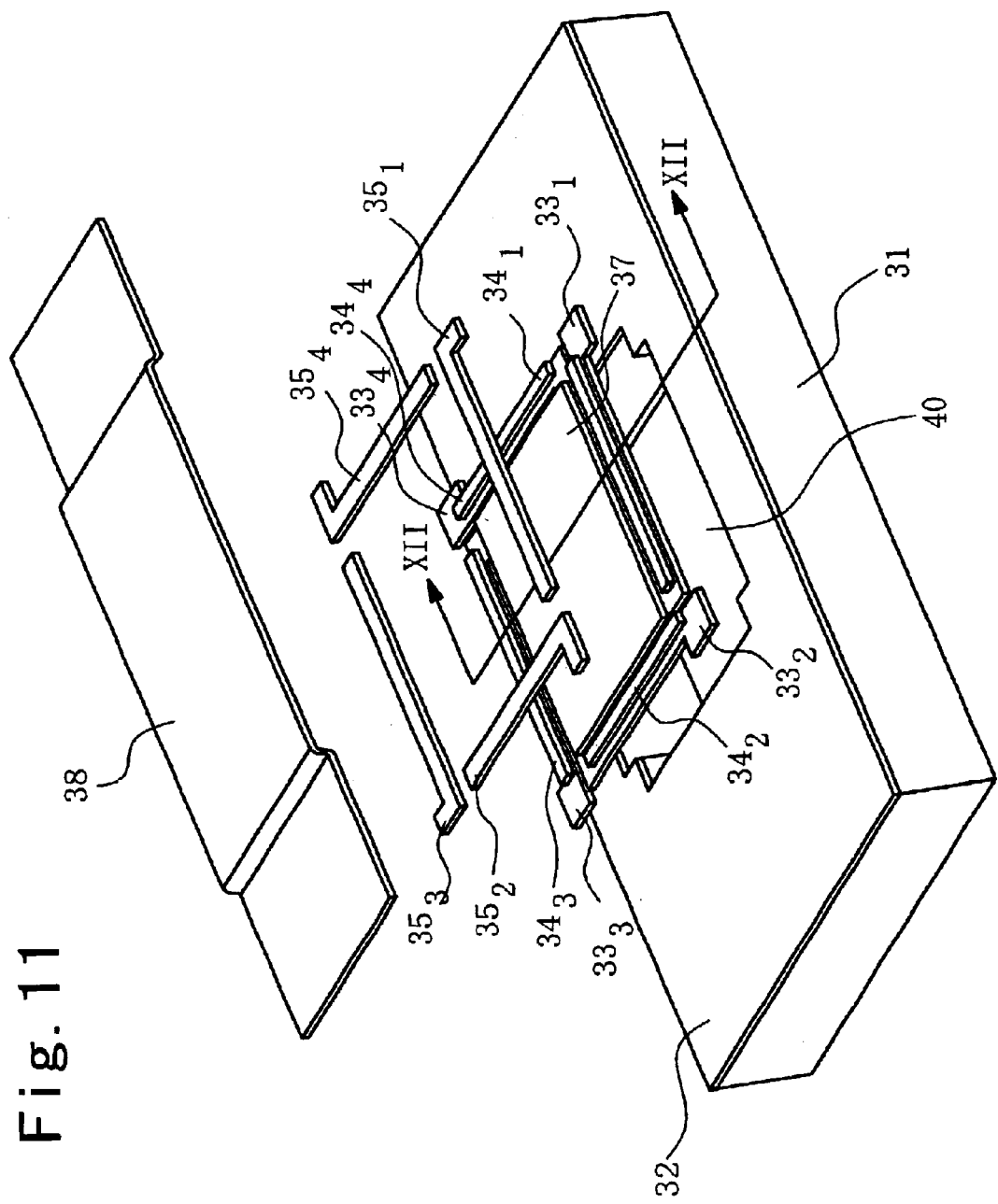
FIG. 11 is an exploded perspective view of a tunable capacitor according to a second embodiment of the present invention.
Figure 12:
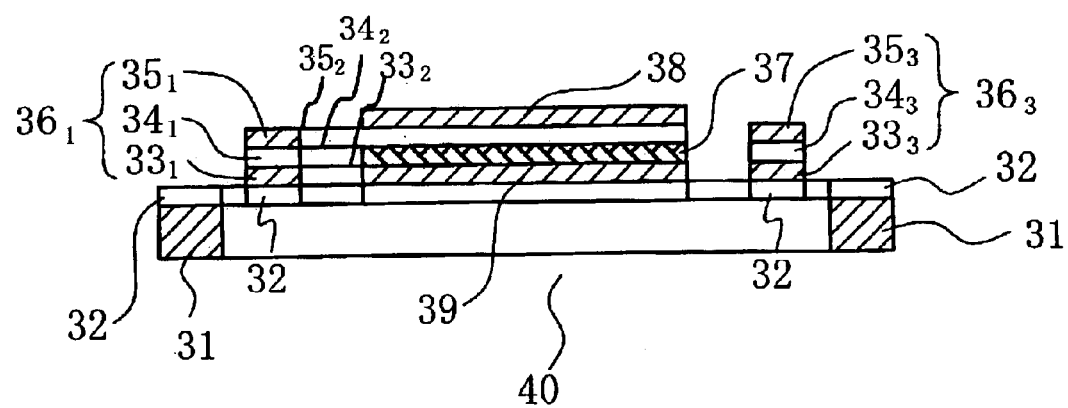
FIG. 12 is a cross-sectional view taken along a line XII—XII shown in FIG. 11.

FIG. 11 is an exploded perspective view of a tunable capacitor according to a second embodiment of the present invention. FIG. 12 is a cross-sectional view taken along a line XII—XII shown in FIG. 11.

The second embodiment of the present invention has an arrangement in which the dielectric layer 37 is provided on the movable electrode 39. The other portions of the second embodiment are the same as corresponding those of the first embodiment. Although the arrangement of the dielectric layer 37 provided on the movable electrode 39 may slightly degrade the shockproof as compared to the first embodiment, the second embodiment has all of the other advantages of the first embodiment. The tunable capacitor shown in FIGS. 11 and 12 can be fabricated by a minor change of the process for the first embodiment of the present invention. More particularly, the steps of FIGS. 6F and 6G are interchanged with each other. That is, the dielectric layer 37 is formed instead of the sacrificial layer 44 in FIG. 6F, and the sacrificial layer 44 is formed instead of the dielectric layer 37 in FIG. 6G. The remaining steps are the same as those described previously. The etching holes that have been described with reference to FIGS. 10F through 10J may be used in the tunable capacitor shown in FIGS. 11 and 12. In FIG. 10F, the dielectric layer 37 is formed instead of the sacrificial layer 44. In FIG. 10G, the sacrificial layer 44 is formed instead of the dielectric layer 37. In FIG. 10H, the etching holes 46 are formed in the stationary electrode 38. The remaining production steps are the same as corresponding those of the first embodiment.

Figure 13:
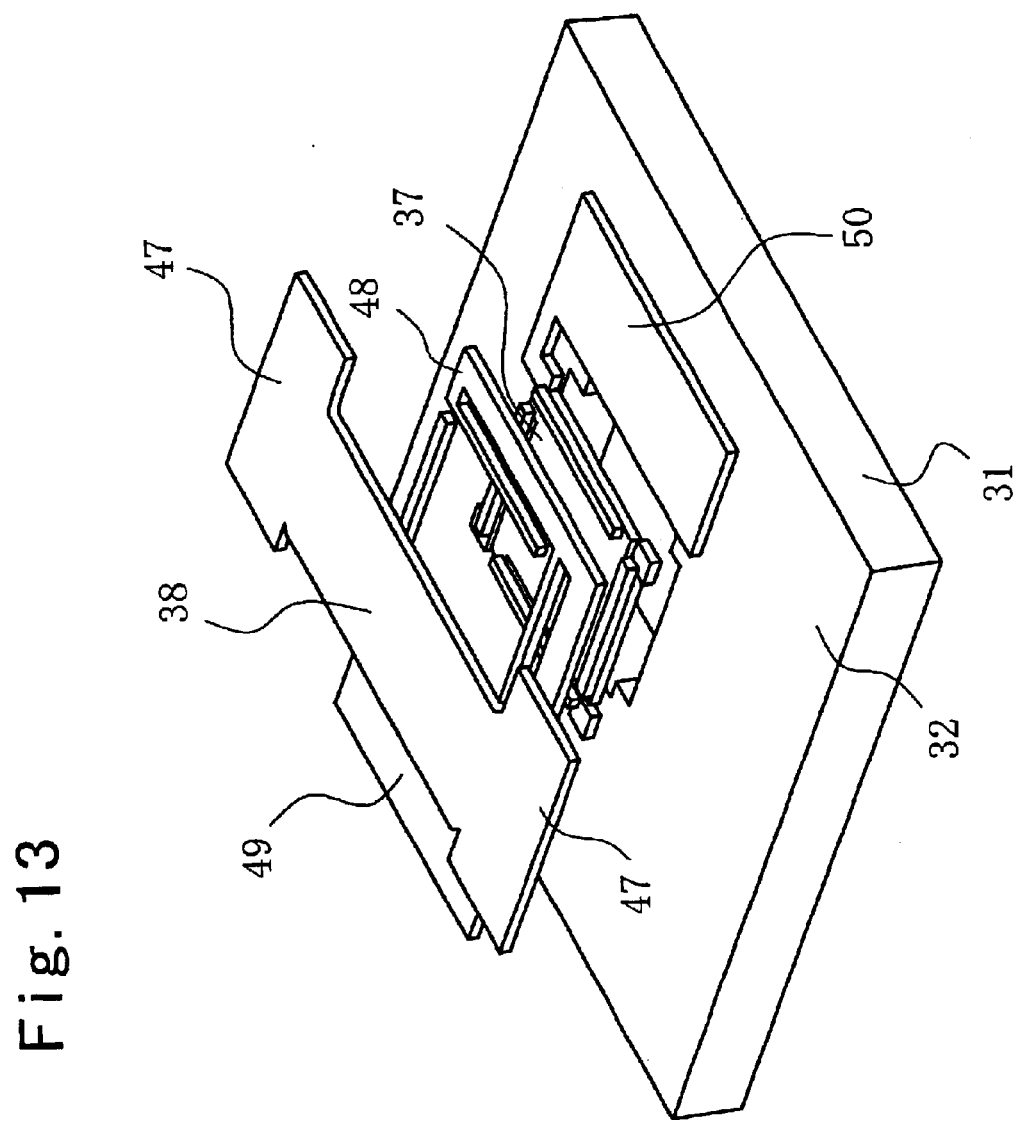
FIG. 13 is an exploded perspective view of a tunable capacitor that corresponds to a variation of the second embodiment of the present invention.
Figure 14:
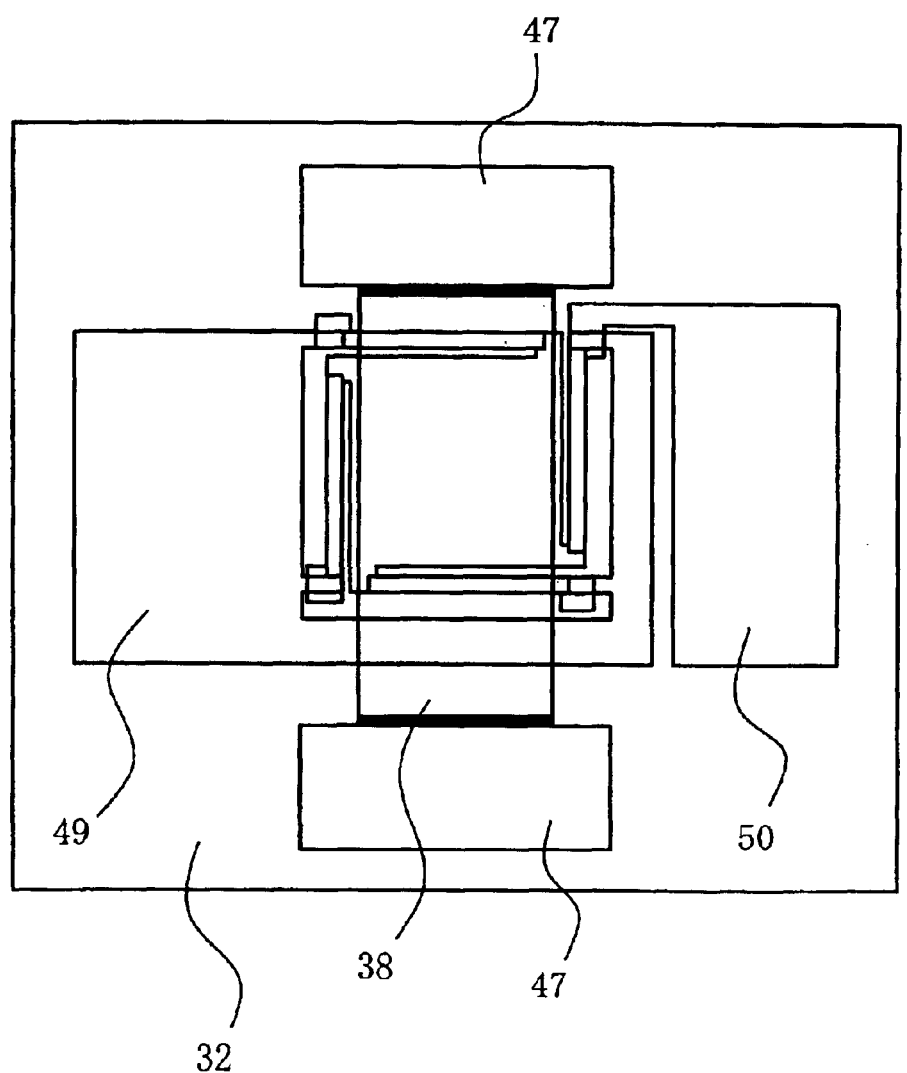
FIG. 14 is a plan view of the tunable capacitor shown in FIG. 13.

FIG. 13 is an exploded perspective view of a variation of the second embodiment of the invention, and FIG. 14 is a plan view thereof. In these figures, parts that are the same those as shown in the previously described figures are given the same reference numerals as previously.

The above-mentioned second embodiment employs the separate upper drive electrodes $35_1$–$35_4$, whereas the tunable capacitor shown in FIGS. 13 and 14 employs a common electrode 48. This common electrode 48 has arm portions that are arranged on the piezoelectric elements $34_1$–$34_4$ and joint portions that join the arm portions. The common electrode 48 is connected to a pad or land 49, which is integrally formed and is used to make an external connection. The pad 49 is formed on the insulation layer 32 on the substrate 31. A pad or land 50 is located on the opposing side so that the stationary electrode 38 is interposed between the pads 49 and 50. The pad 50 is formed on the insulation layer 32. The pad 50 is connected to the movable electrode 39 and the lower drive electrodes $33_1$–$33_4$ of the piezoelectric actuators $36_1$–$36_4$. The stationary electrode 38 has pads 47 on both sides thereof in the longitudinal direction. The pads 47 are used to make external connections with the stationary electrode 38. The variation thus formed has the same functions and advantages of those of the second embodiment of the present invention.

The common electrode 48 may be applied to the first embodiment of the present invention. Also, the pads 47, 49 and 50 may be applied to the first embodiment of the present invention. The pads 47, 48 and 50 have comparatively wide areas, which improve workability of making external connections.

Third Embodiment

Figure 15:
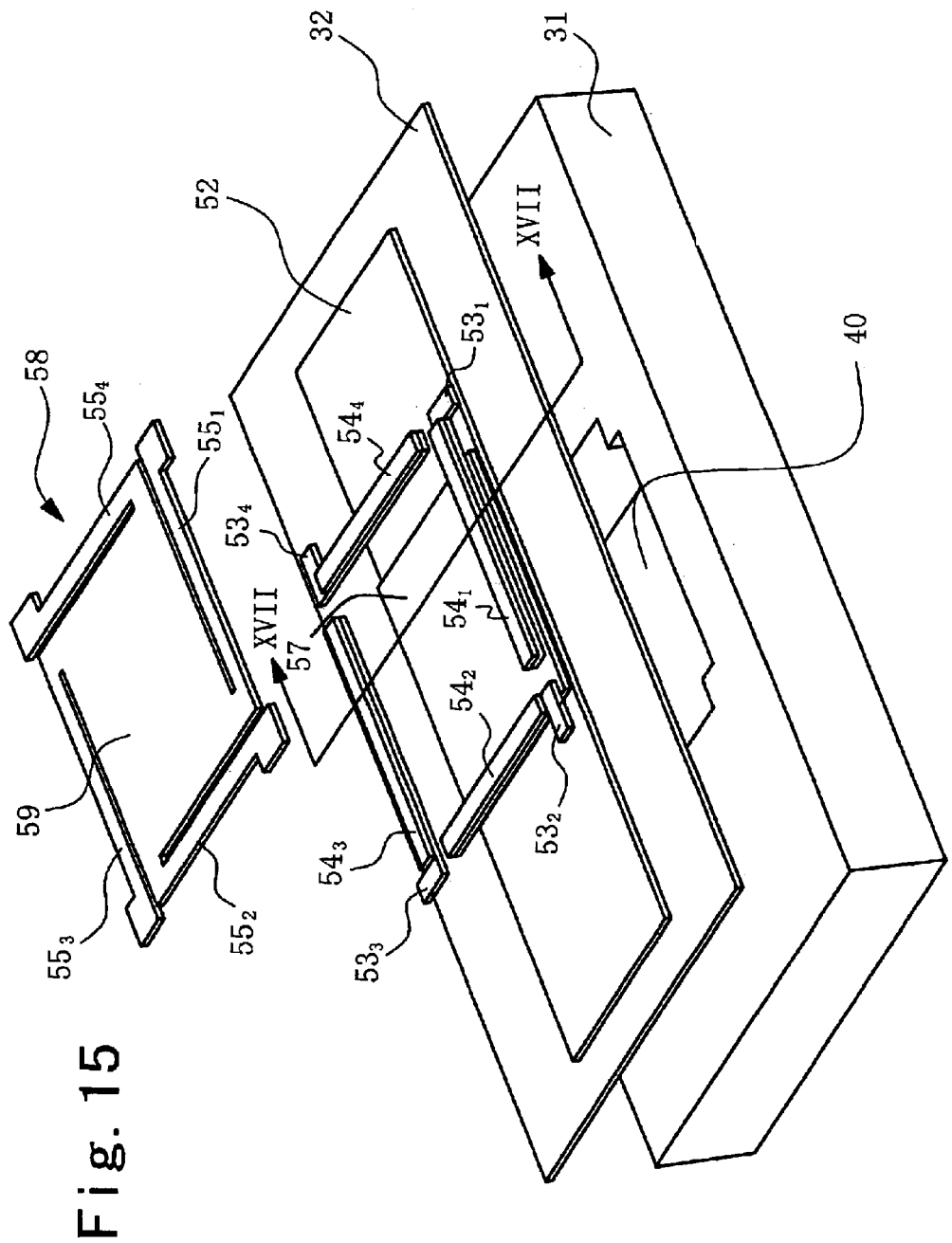
FIG. 15 is an exploded perspective view of a tunable capacitor according to a third embodiment of the present invention.

FIG. 15 is an exploded perspective view of a tunable capacitor according to a third embodiment of the present invention. The present invention has an arrangement in which the stationary electrode is provided on the substrate side. In the following description, FIG. 17I is referred to together with FIG. 15. FIG. 17I is a cross-sectional view taken along a line XVII—XVII. FIGS. 16A through 16E and 17F through 17I show a method of fabricating the tunable capacitor shown in FIG. 15.

The insulation layer 32 is provided on the substrate 31. The substrate 31 has the opening 40. The insulation layer 32 is provided so as to bridge the opening 40. In other words, the insulation layer 32 is provided in a diaphragm fashion. This is different from the insulation layer used in the first embodiment of the present invention. The capacitor includes a stationary electrode 52, a movable electrode 59 and a dielectric layer 57 supported by the stationary electrode 52. The movable electrode 59 is driven by four piezoelectric actuators. In FIG. 17I, only two piezoelectric actuators $56_1$ and $56_3$ are illustrated, and the remaining two piezoelectric actuators $56_2$ and $56_4$ do not appear. The piezoelectric actuator $56_1$ is of unimorph type and is composed of a lower drive electrode $53_1$, a piezoelectric element $54_1$, and an upper drive electrode $56_1$. Similarly, as shown in FIG. 17I, the piezoelectric actuator $56_3$ is composed of a lower drive electrode $53_3$, a piezoelectric element $54_3$ and an upper drive electrode $56_3$. The lower drive electrode $53_3$ is located above the opening formed in the substrate 31 via the insulation film 32. The other piezoelectric actuators $56_1$, $56_2$ and $56_4$ are configured as mentioned above.

The stationary electrode 52 is provided on the insulation layer 32. The stationary electrode 52 is flat and is therefore different from the stationary electrode 38. The dielectric layer 57 is provided on the stationary electrode 52. The movable electrode 59 is provided so as to face the dielectric layer 57 via the air layer. The movable electrode 59 is a part of the common electrode 58. The common electrode 58 includes upper drive electrodes $55_1$, $55_2$, $55_3$ and $55_4$, and continues to the movable electrode 59. Separate lower drive electrode $53_1$, $53_2$, $53_3$ and $53_4$ are provided so as to face the upper drive electrodes $55_1$, $55_2$, $55_3$ and $55_4$. The lower drive electrodes $53_1$, $53_2$, $53_3$ and $53_4$ are provided integrally with comparatively wide pads on the insulation layer 32.

The third embodiment of the present invention has the same functions as those of the first embodiment thereof. When a voltage is applied across the lower drive electrodes $53_1$, $53_2$, $53_3$ and $53_4$ and the upper drive electrodes $55_1$, $55_2$, $55_3$ and $55_4$, the piezoelectric elements $54_1$–$54_4$ are contracted in the d31 direction. This contraction displaces the movable electrode 59 towards the stationary electrode 52, so that the distance between the movable electrode 59 and the stationary electrode 52 can be changed. The intervening dielectric layer 57 changes the dielectric constant and greatly changes the electrostatic capacitance between the movable electrode 59 and the stationary electrode 52.

The tunable capacitor according to the third embodiment of the present invention has an extremely large capacitance and an extremely large tunable range. Since the movable electrode 59 is controlled by expansion/contraction of the piezoelectric actuators $56_1$–$56_4$, the thickness of the air layer $d_{air}$ can be continuously changed, so that a fine adjustment of the capacitance can be achieved. Particularly, as the movable electrode 59 becomes closer to the dielectric layer 57, the capacitance changes more greatly and the Q value obtained at this time is extremely large.

Since the stationary electrode 52, the movable electrode 59, the dielectric layer 57 and the piezoelectric actuators $56_1$–$56_4$ are supported by the same (single) substrate 31, the tunable capacitor is compact and less expensive. Further, since the stationary electrode 52 supports the dielectric layer 57, the mass of the movable part is only the mass of the movable electrode 59, and the shockproof characteristic is excellent. In addition, the presence of the dielectric layer 57 avoids the possibility of short-circuiting between the movable electrode 59 and the stationary electrode 52, and prevents breakdown of the tunable capacitor.

A description will now be given, with reference to FIGS. 16A through 16E and 17F through 17I, of a method of fabricating the tunable capacitor according to the third embodiment of the present invention. FIGS. 16A through 16E and 17F through 17I are cross-sectional views taken along the line XVII—XVII shown in FIG. 15.

First, as shown in FIG. 16A, the insulation layer 32 of silicon nitride or silicon oxide is formed on the substrate 31 of silicon. Next, as shown in FIGS. 16B and 16C, the stationary electrode 52 and the dielectric layer 57 are formed on the insulation layer 32 by the photolithography techniques.

Figure 17F:
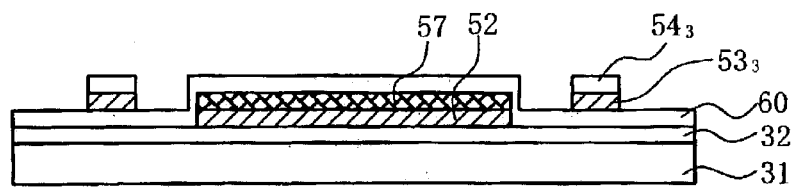
FIGS. 17F, 17G, 17H and 17I and are cross-sectional views showing steps of the method that follow a series of steps of FIGS. 16A–16E.
Figure 17G:
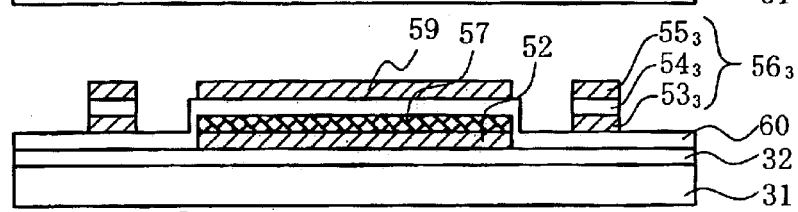

Then, as shown in FIG. 16D, a sacrificial layer 60 of resist is formed on the entire surface, and the unimorph piezoelectric actuators $56_3$ composed of the lower drive electrode $53_1$, the piezoelectric element $54_1$ and the upper drive electrode $55_1$ is formed as shown in FIGS. 16E, 17F and 17G. Of course, the other piezoelectric actuators $56_1$, $56_2$ and $56_4$ are formed simultaneously. In addition, the movable electrode 59 is simultaneously formed.

Figure 17H:
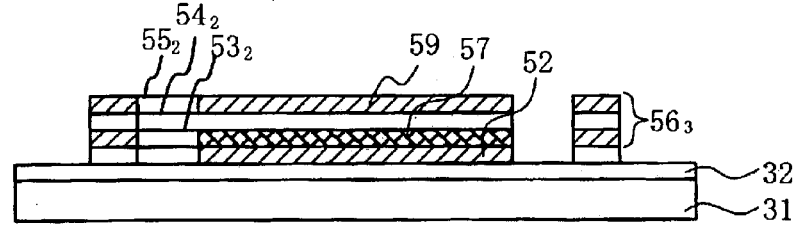
Figure 17I:
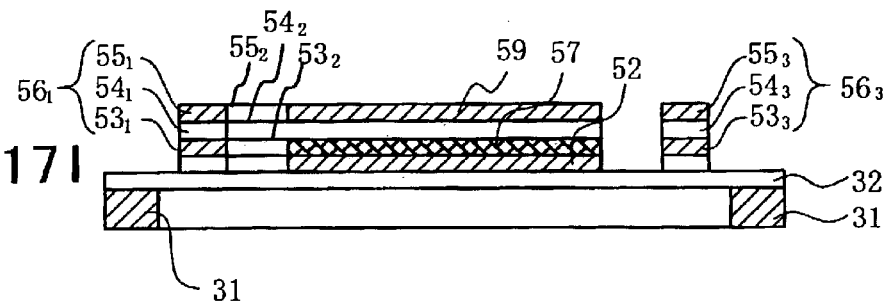

Then, as shown in FIG. 17H, the sacrificial layer 60 is removed so that the gap between the dielectric layer 57 and the movable electrode 59 can be defined. Then, the piezoelectric elements $54_1$–$54_4$ are annealed.

Finally, as shown in FIG. 17I, the substrate 31 in the periphery of the insulation layer 32 below the movable electrode 59 is etched by the RIE apparatus from the backside of the substrate 31. Thus, the stationary electrode 52 and the underlying insulation electrode 32 are supported in diaphragm fashion. In this manner, the tunable capacitor can be obtained.

Although not illustrated as in the case of the first embodiment of the present invention, even when the piezoelectric actuators $56_1$–$56_4$ are distorted so that the movable electrode 59 is brought into contact with the dielectric layer 57, the upper drive electrode $55_1$–$55_4$ and the stationary electrode 52 do not contact each other.

Figure 18F:
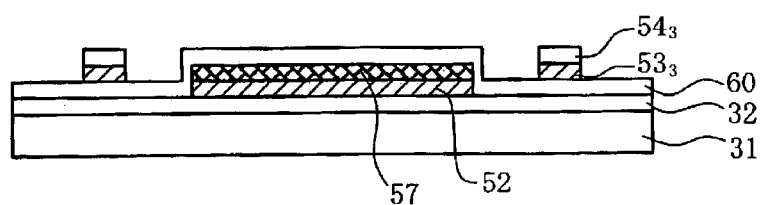
FIGS. 18F, 18G, 18H and 18I are cross-sectional views of a series of steps of another method of fabricating the tunable capacitor shown in FIGS. 13 and 14.
Figure 18G:
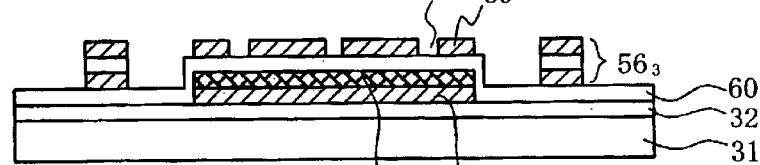

FIGS. 18F through 18I illustrate a variation of the above-mentioned fabrication method. This variation is intended to facilitate removal of the sacrificial layer 60. FIGS. 18F through 18I show steps that are substituted for those of FIGS. 17F through 17I. The step of FIG. 18F follows the step of FIG. 17E. As shown in FIG. 18F, the lower drive electrode $53_3$ and the piezoelectric element $54_3$ are formed on the sacrificial layer 60 in turn. As shown in FIG. 18G, the upper drive electrode $55_3$ and the movable electrode 59 are formed, and etching holes arranged, for example, in matrix formation are formed in the movable electrode 59.

Figure 18H:
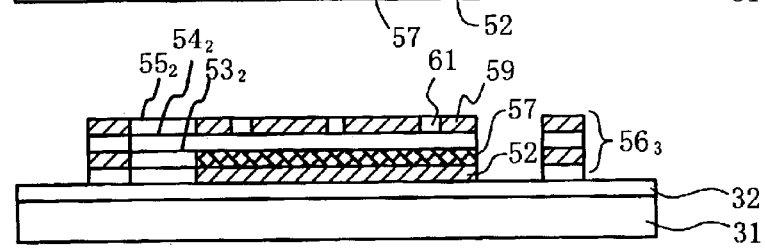
Figure 18I:
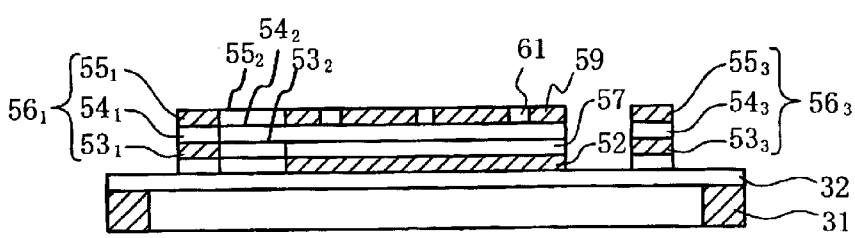

Then, as shown in FIG. 18H, the sacrificial layer 60 is removed so that a gap is defined between the dielectric layer 57 and the movable electrode 59. Thereafter, the piezoelectric elements $54_1$–$54_4$ are thermally treated. Removal of the sacrificial layer 60 is efficiently and effectively performed not only along the sides of the movable electrode 59 but also via the etching holes 61. Finally, as shown in FIG. 18I, the substrate 31 in the periphery of the piezoelectric actuators $56_1$–$56_4$ and the insulation layer 32 below the movable electrode 59 is etched by the RIE apparatus from the backside of the substrate 31. Thus, the stationary electrode 52 and the underlying insulation layer 32 are formed in diaphragm fashion. In this manner, the tunable capacitor of the present embodiment can be obtained.

Fourth Embodiment

Figure 19:
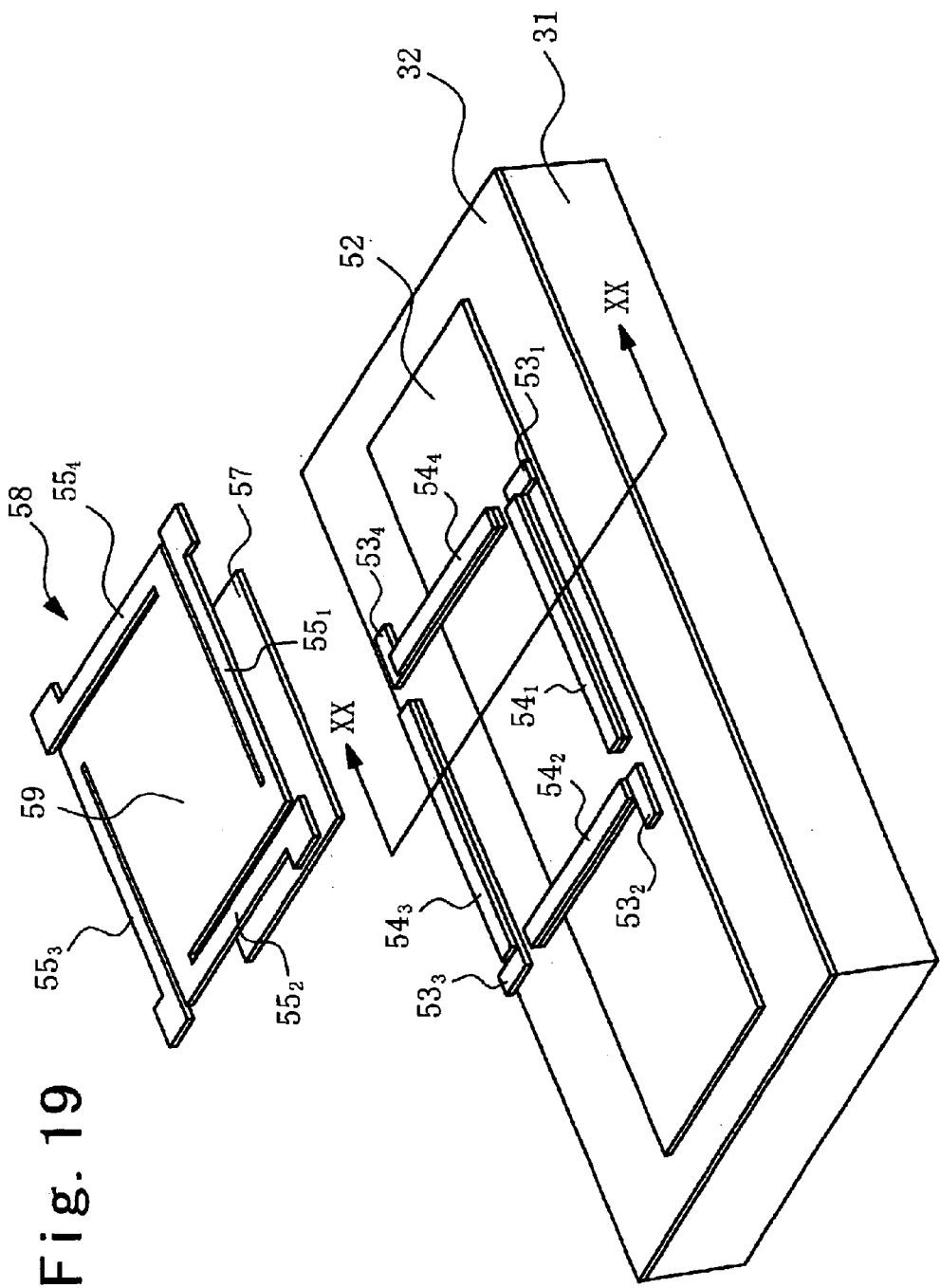
FIG. 19 is an exploded perspective view of a tunable capacitor according to a fourth embodiment of the present invention.
Figure 20:
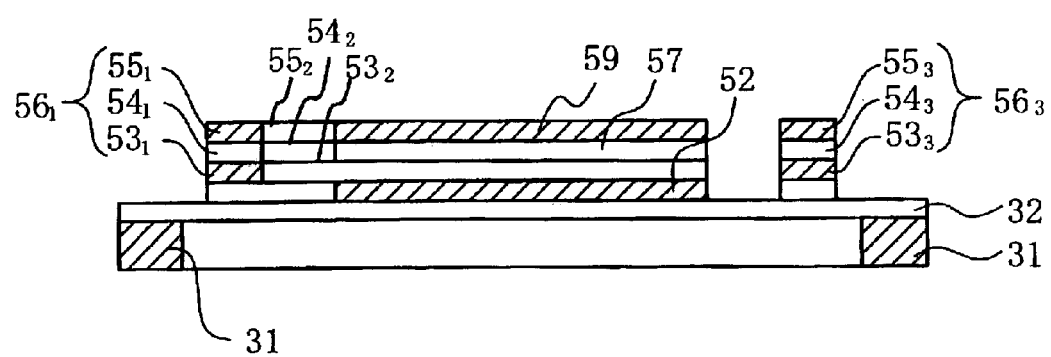
FIG. 20 a cross-sectional view taken along a line XX—XX shown in FIG. 19.

FIG. 19 is an exploded perspective view of a tunable capacitor according to a fourth embodiment of the present invention. FIG. 20 is a cross-sectional view taken along a line XX—XX shown in FIG. 19.

The present embodiment has an arrangement in which the dielectric layer 57 is attached to the inner wall of the movable electrode 59. The other parts are configured as those of the aforementioned third embodiment of the present invention. Since the dielectric layer 57 is supported by the movable electrode 59, the shockproof may slightly be degraded. However, the other advantages of the third embodiment hold true for the fourth embodiment. The tunable capacitor thus configured can be fabricated by varying the process shown in FIGS. 16A through 16E and 17F through 17I so that the sacrificial layer 60 is formed first, and the dielectric layer 57 is formed second.

Fifth Embodiment

Figure 21:
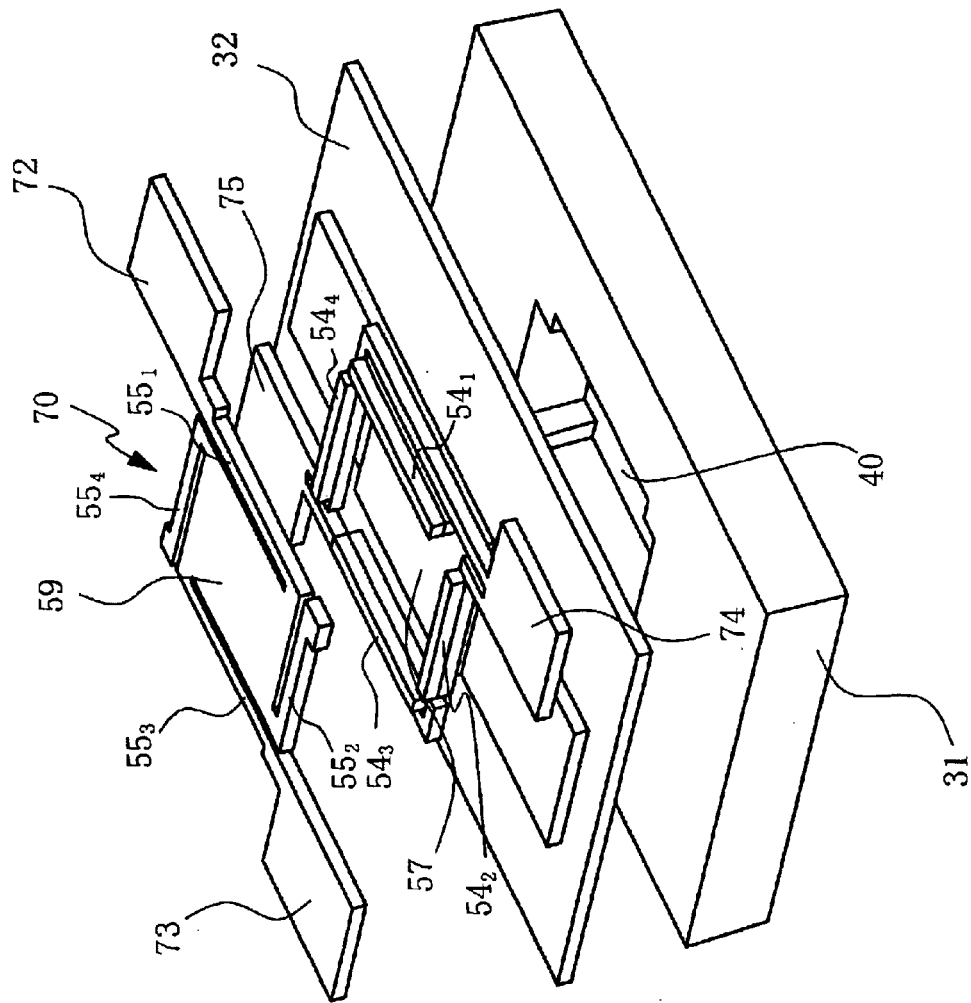
FIG. 21 is an exploded perspective view of a tunable capacitor according to a fifth embodiment of the present invention.
Figure 22:
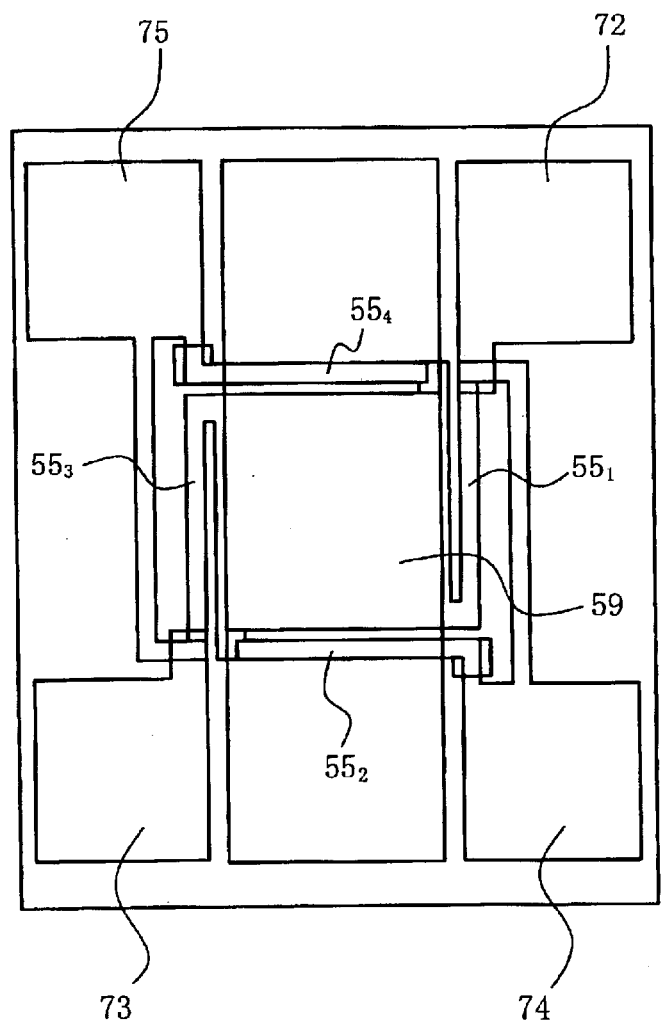
FIG. 22 is a plan view of the tunable capacitor shown in FIG. 21.

FIG. 21 is an exploded perspective view of a tunable capacitor according to a fifth embodiment of the present invention, and FIG. 22 is a plan view thereof. In FIGS. 21 and 22, parts that are the same as those shown in the previously described figures are given the same reference numerals as previously.

According to the fifth embodiment of the present invention, the stationary electrode 52 is located on substrate 31. A common electrode 70 includes the movable electrode 59, the upper drive electrodes $55_1$–$55_4$ and pads or lands 72 and 73 for making external connections. The pads 72 and 73 are symmetrical about the movable electrode 59 and are diagonally arranged. The lower drive electrodes of the four piezoelectric actuators have a common electrode with a pad 74, and a common electrode with a pad 75. The common electrode with the pad 74 has two lower drive electrodes. One of these lower drive electrodes runs straight and a folded portion, and the other lower drive electrode is bent so as to form "L" and runs along the short-length side of the substrate 31. The pads 74 and 75 are arranged on the other diagonal line of the movable electrode 59. The dielectric layer 57 is provided on the stationary electrode 52.

The pads 47, 48 and 50 have comparatively wide areas, which improve workability of making external connections. The method of fabricating the tunable actuator shown in FIGS. 21 and 22 is a simple variation of the process shown in FIGS. 16A through 18I, and a description thereof will be omitted here.

Sixth Embodiment

Figure 23:
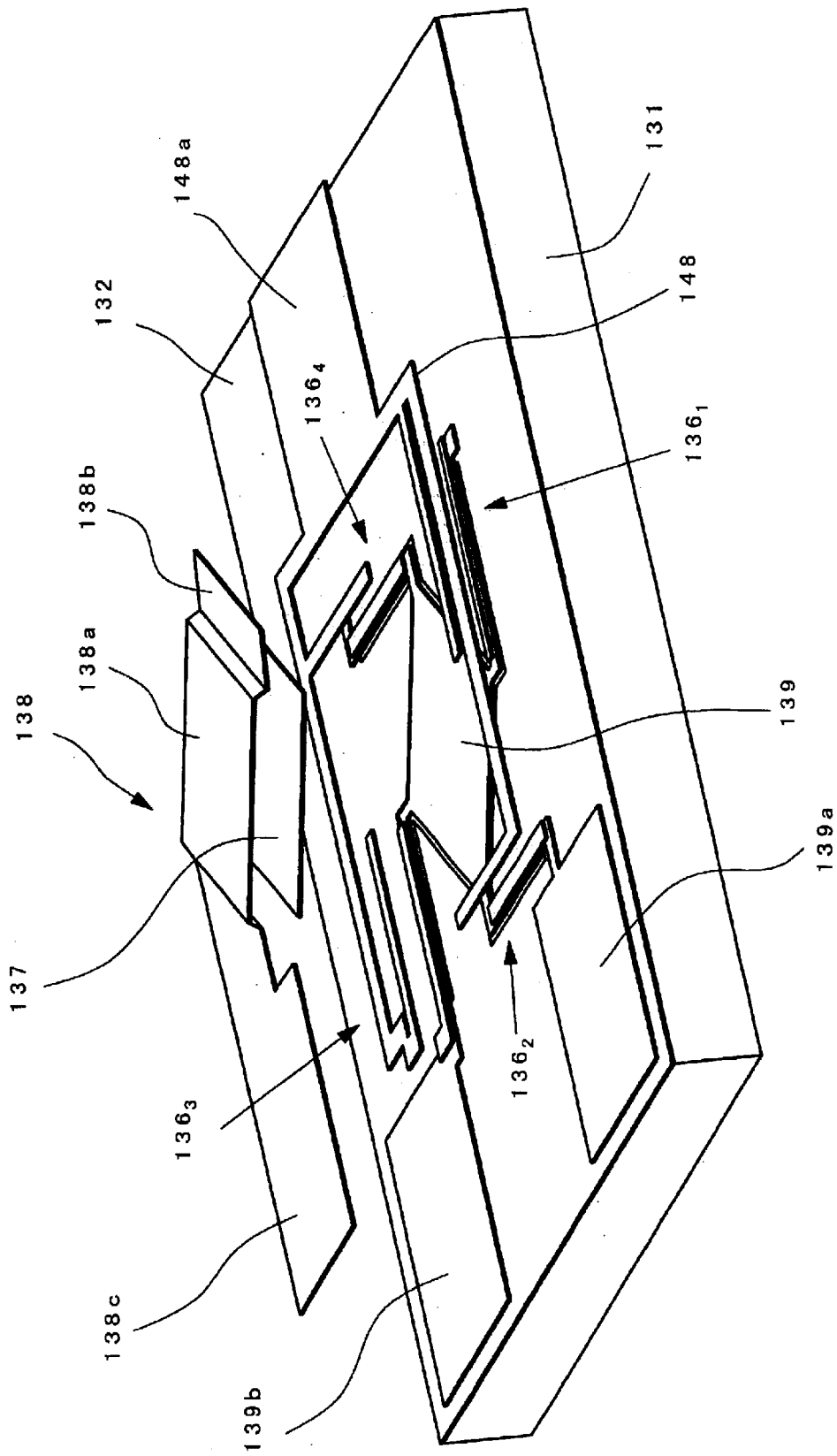
FIG. 23 is an exploded perspective view of a tunable capacitor according to a sixth embodiment of the present invention.
Figure 24:
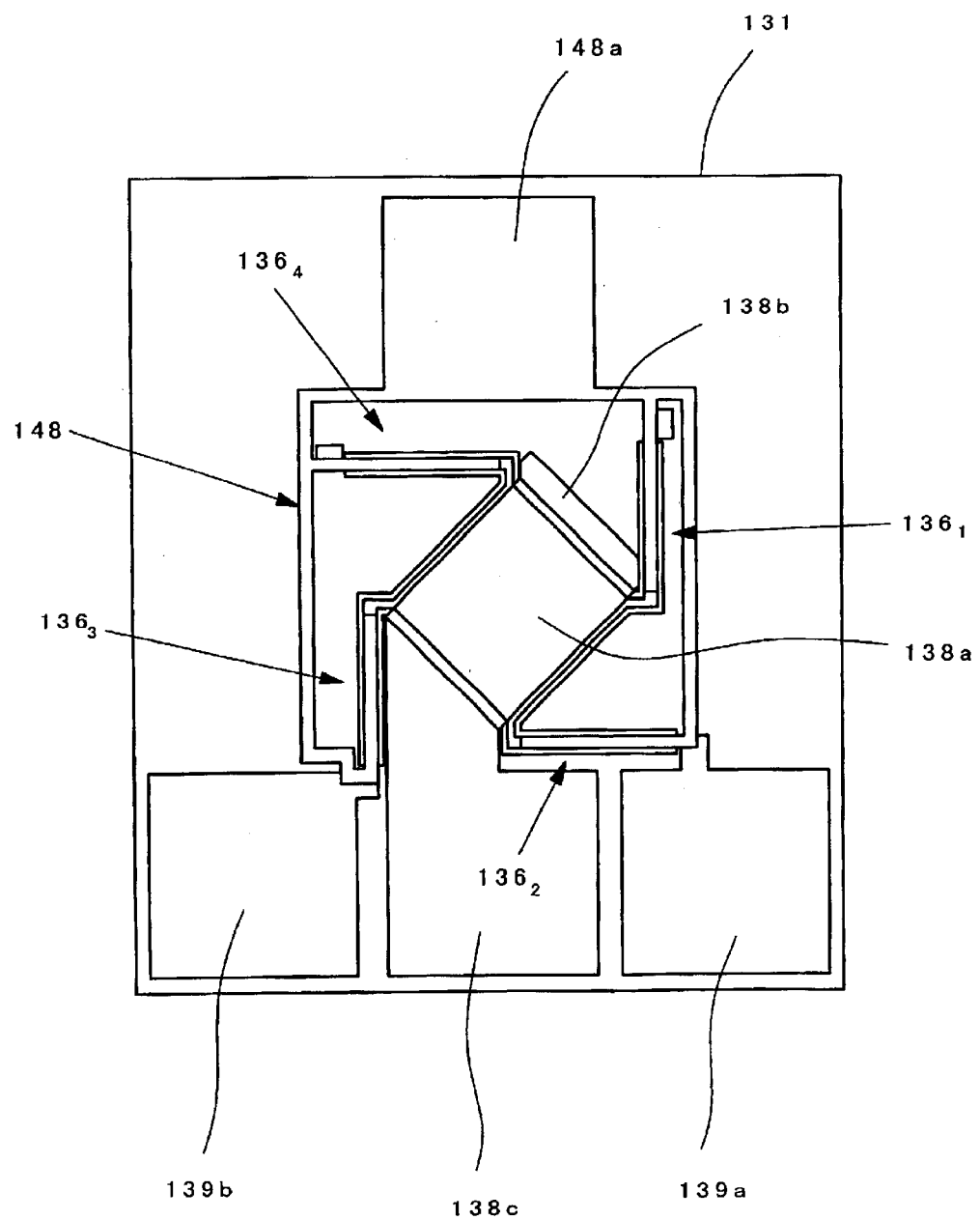
FIG. 24 is a plan view of the tunable capacitor shown in FIG. 23.
Figure 25:
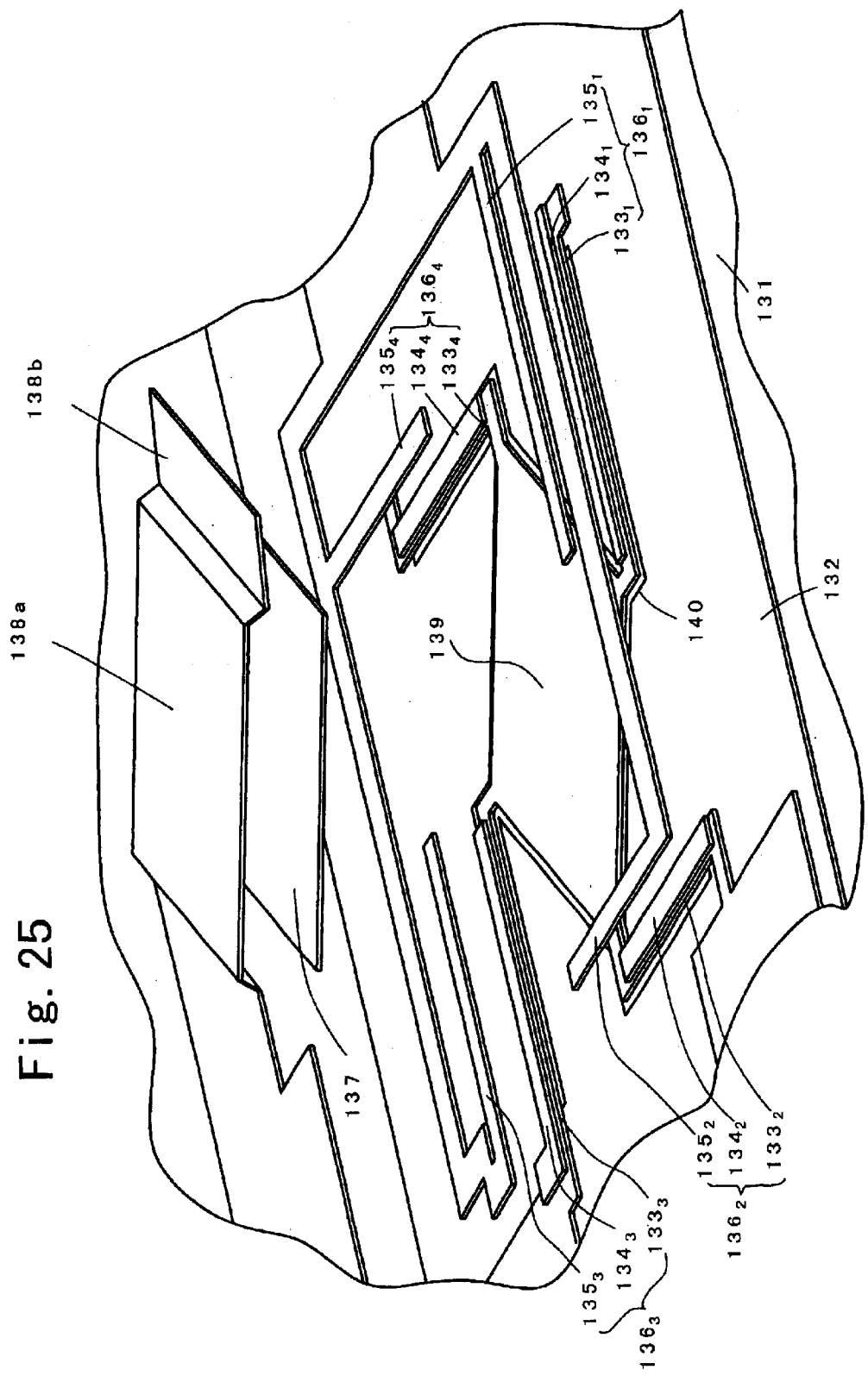
FIG. 25 is an enlarged perspective view of a part of the tunable capacitor shown in FIG. 23.

FIG. 23 is an exploded perspective view of a tunable capacitor according to a sixth embodiment of the present invention, and FIG. 24 is a plan view thereof. FIG. 25 is an enlarged perspective view of a part of the tunable capacitor shown in FIGS. 23 and 24.

The tunable capacitor has a substrate 131, four piezoelectric actuators $136_1$–$136_4$, a movable electrode 139, a dielectric layer 137 and a stationary electrode 138. The stationary electrode 138 has a portion 138a, which bridges the movable electrode 139. Hereinafter, the portion 138a is referred to as bridge portion. This bridge portion 138a has almost the same shape as that of the movable electrode 139, and is provided so as to face the movable electrode 139 via the dielectric layer 137. In other words, the bridge portion 138a of the stationary electrode 138 faces only the movable electrode 139. A supporting portion 138b of the stationary electrode 138 is obliquely arranged with respect to the directions in which the piezoelectric actuators $136_1$–$136_4$ run, and is provided along a corresponding one of the four edges of the movable electrode 139. The bridge portion 138a is obliquely provided with respect to a pad part 138c, which also functions to support the bridge portion 138a. The bridge portion 138a does not bridge the piezoelectric actuators $136_1$–$136_4$ at all.

With the stationary electrode 138, it is possible to eliminate the following problems. If the bridge portion is too long to bridge an area other than the movable electrode, the tunable capacitor is liable to be affected by residual stress that develops at the time of forming the stationary electrode and surface tension that develops after cleaning. Thus, the bridge portion may be deformed toward the movable electrode or in the reverse direction. It is no longer possible to keep the gap between the stationary and movable electrodes constant. This causes dispersion of the electrostatic capacitance and degrades the production yield. Particularly, in a case where tension stress remains in the stationary electrode as residual stress, the gaps between the upper drive electrodes that form the piezoelectric actuators and the stationary electrode are reduced and may be brought into contact therewith. This may damage the piezoelectric actuators, movable electrodes or stationary electrode. Further, in the case where the stationary electrode bridges any of the piezoelectric actuator, a parasitic capacitance may be formed between the stationary electrode and the bridged piezoelectric actuator.

In contrast, according to the sixth embodiment of the present invention, the bridge portion 138a of the stationary electrode 138 that bridges the movable electrode 139 is comparatively short, and is mechanically strong. Thus, it is possible to avoid any influence of the residual stress at the time of forming the stationary electrode and the surface tension in cleaning and to thus realize the tunable capacitor having small dispersion of the electrostatic capacitance and improved production yield. Further, no parasitic capacitance exists because the stationary electrode 138 does not bridge the piezoelectric actuators $136_1$–$136_4$.

The other parts of the tunable capacitor according to the sixth embodiment of the present invention are configured as follows. The dielectric layer 137 is attached to the bridge portion 138a. An opening 140 is formed in the substrate 131 so as to face the backside of the movable electrode 139 (FIG. 25). A piezoelectric actuator $136_1$, is composed of a lower drive electrode $133_1$, a piezoelectric element $134_1$, and an upper drive electrode $135_1$. Similarly, piezoelectric actuators $136_2$, $136_3$ and $136_4$ are composed of lower drive electrodes $133_2$, $133_3$ and $133_4$, piezoelectric elements $134_2$, $134_3$ and $134_4$, and upper drive electrodes $135_2$, $135_3$ and $135_4$, respectively. The movable electrode 139 and the lower drive electrodes $133_1$–$133_4$ are integrally formed as a common electrode. This common electrode has pads 139a and 139b, which are used to make external connections and are provided on the insulation layer 132. The upper drive electrodes $135_1$–$135_4$ are integrally formed and are connected to an integrally formed pad 148 for making an external connection.

FIGS. 26E through 26J are cross-sectional views of steps of a method of fabricating the tunable capacitor according to the sixth embodiment of the present invention, these cross-sectional views being taken along a line running in the short-length side of the tunable capacitor. The step of FIG. 26E follows the step of FIG. 5D. The piezoelectric actuators are omitted from FIGS. 26E through 26J for the sake of simplicity. Further, a description of the process conditions and materials that have been described will be omitted here.

Figure 26E:
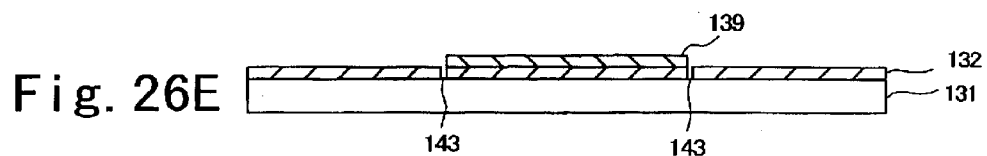
FIGS. 26E, 26F, 26G, 26H, 26I and 26J are cross-sectional views showing steps of the method that follow a series of steps of FIGS. 16A–16E.

Referring to FIG. 26E, the movable electrode 139 is formed on the insulation layer 132, which includes a trench or groove 143 formed by patterning. The movable electrode 139 is formed on an area on the insulation layer surrounded by the groove 143.

Figure 26F:
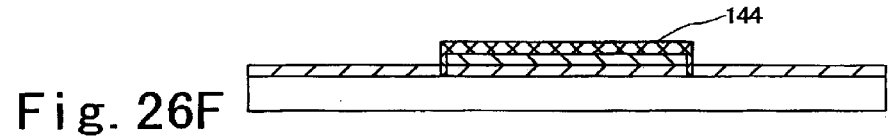

As shown in FIG. 26F, a sacrificial layer 144 is formed on the movable electrode 139. In this process, the sacrificial layer 144 is deposited in the groove 143.

Figure 26G:
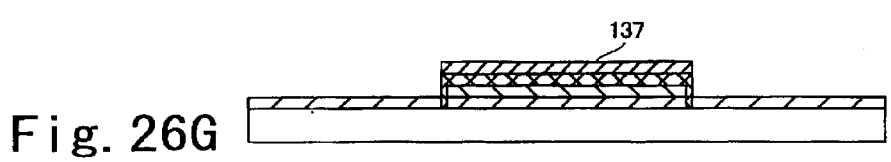

Then, as shown in FIG. 26G, the dielectric layer 137 is formed on the sacrificial layer 144.

Figure 26H:
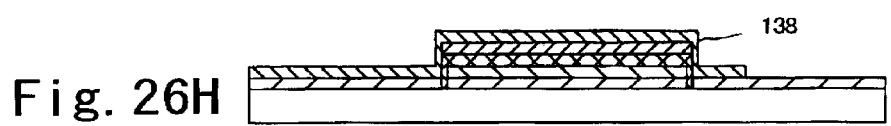

Thereafter, as shown in FIG. 26H, the stationary electrode 138 is formed on the dielectric layer 137 and the insulation layer 132.

Figure 26I:
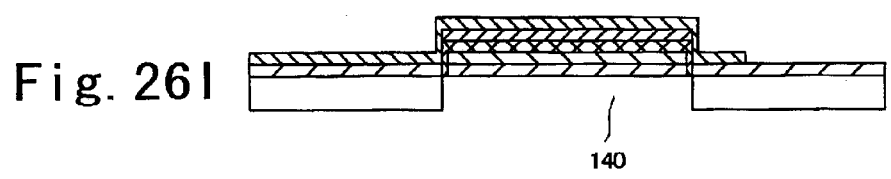

Then, as shown in FIG. 26I, the substrate 131 is etched so as to form the opening 140 below the movable electrode 139.

Figure 26J:
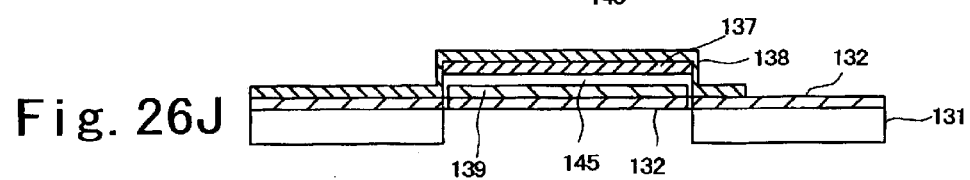

Finally, the sacrificial layer 144 is removed as shown in FIG. 26J.

In the processes of FIGS. 26G and 26H, it is preferable to form multiple etching holes such as those that have been described with reference to FIGS. 10G and 10H. The etching holes facilitates removal of the sacrificial layer 144 more efficiently and effectively in the process of FIG. 26J.

Seventh Embodiment

Figure 28:
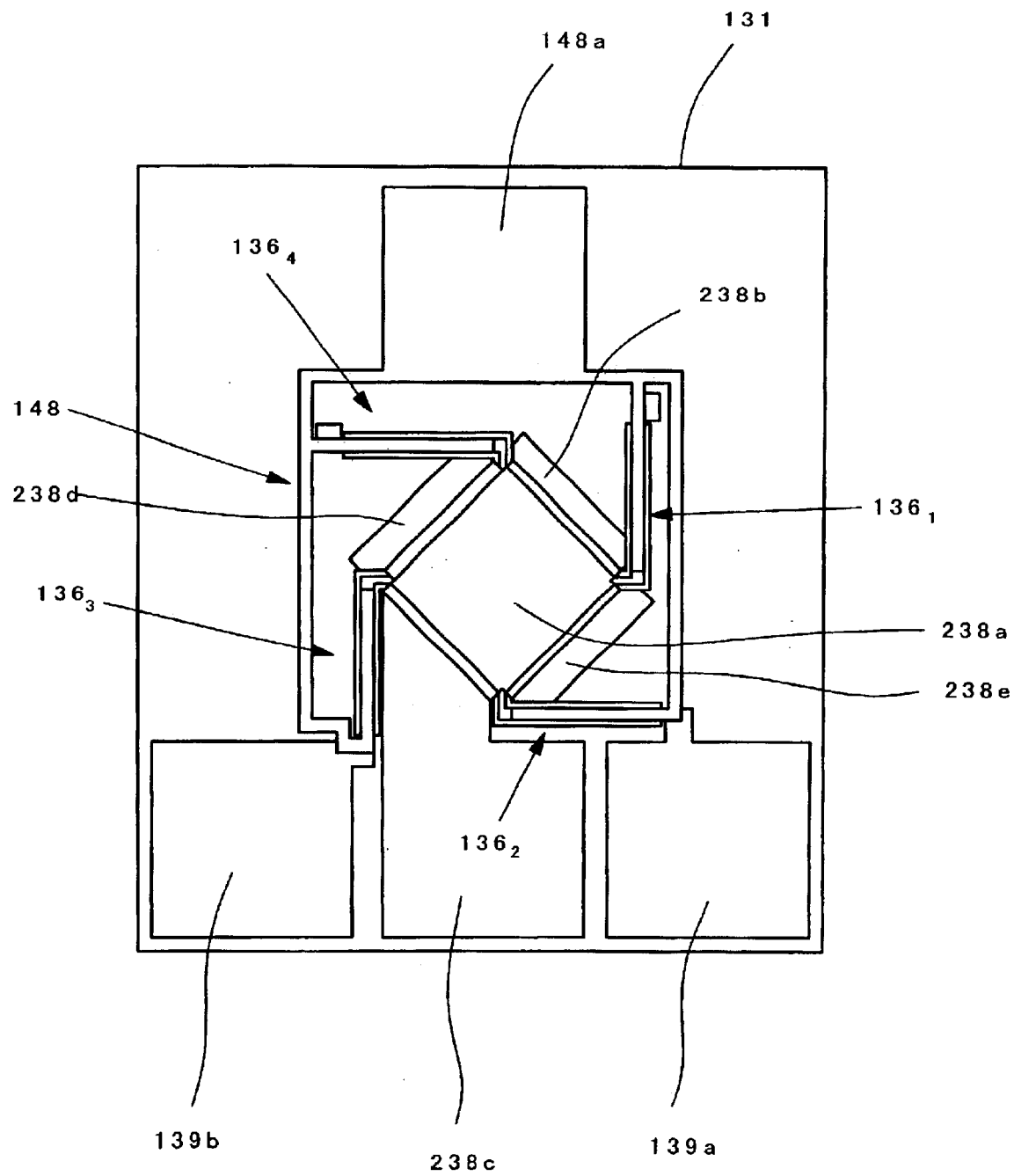
FIG. 28 is a plan view of the tunable capacitor shown in FIG. 27.
Figure 29:
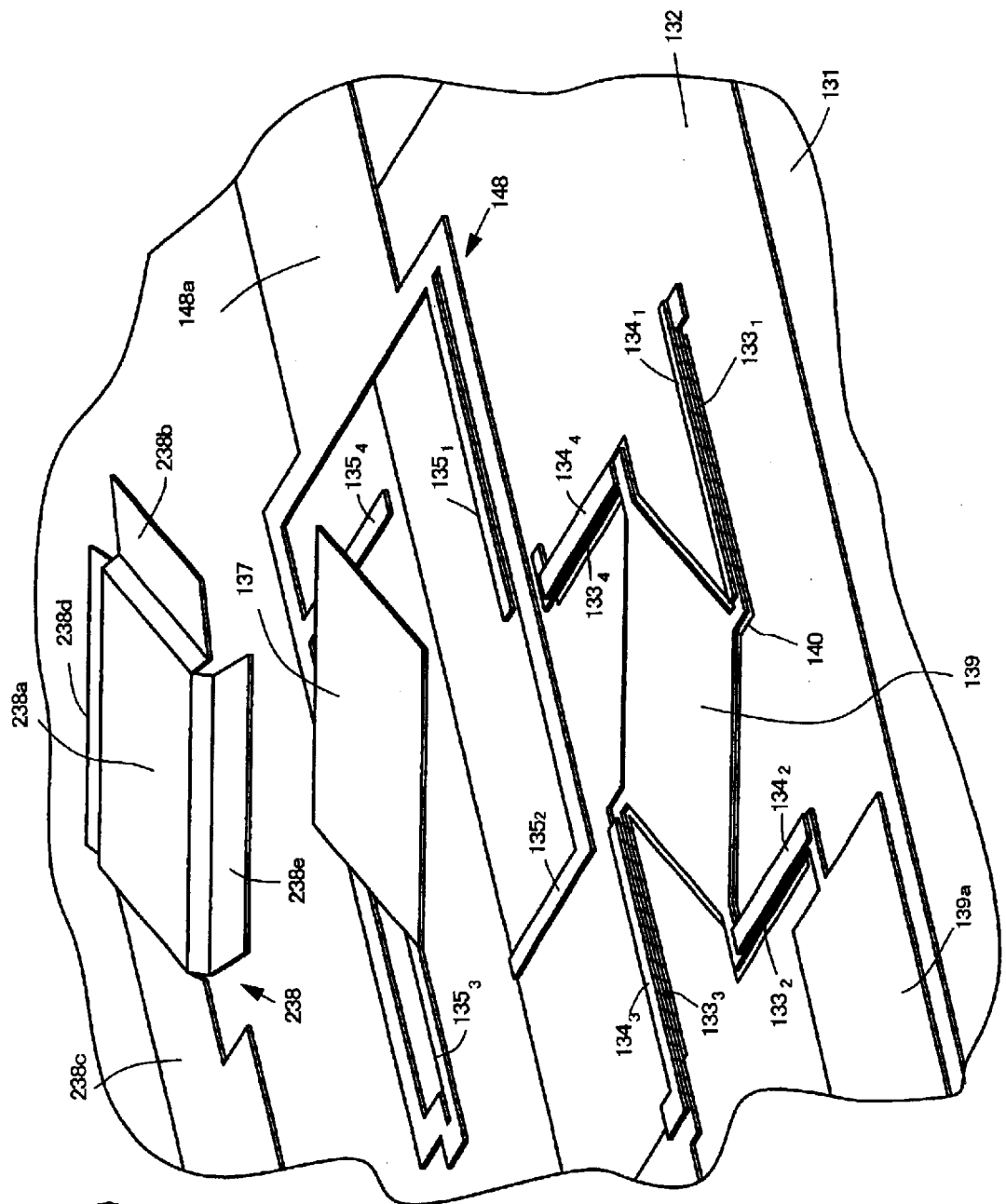
FIG. 29 is an enlarged perspective view of a part of the tunable capacitor shown in FIG. 27.

FIG. 27 is an exploded perspective view of a tunable capacitor according to a seventh embodiment of the present invention, and FIG. 28 is a plan view thereof. FIG. 29 is an enlarged perspective view of a part of the tunable capacitor shown in FIG. 27. In these figures, parts that are the same as those shown in FIGS. 23 through 25 are given the same reference numerals as previously.

The tunable capacitor includes a stationary electrode 238 in addition to the aforementioned substrate 131, four piezoelectric actuators $136_1$–$136_4$, movable electrode 139 and dielectric layer 137. The stationary electrode 238 has a different structure as that of the sixth embodiment. The stationary electrode 238 includes a bridge portion 238a, a support portion 238b, a pad portion 238c (which functions to support the bride portion 238a), and support portions 238d and 238e. The bridge portion 238a are supported in four locations by the support portions 238b, 238c, 238d and 238e on the insulation layer 132 on the substrate 131. The support portions 238b–238e are arranged along the four sides of the movable electrode 139. The stationary electrode 238 corresponds to a variation obtained by adding the support portions 238d and 238e to two sides of the stationary electrode 138 shown in FIGS. 23 through 25. Since the bridge portions are supported in four locations, the strength can be further enhanced. The bride portion 238a may be varied so as to be supported in three or five locations or more.

Eighth Embodiment

Figure 30:
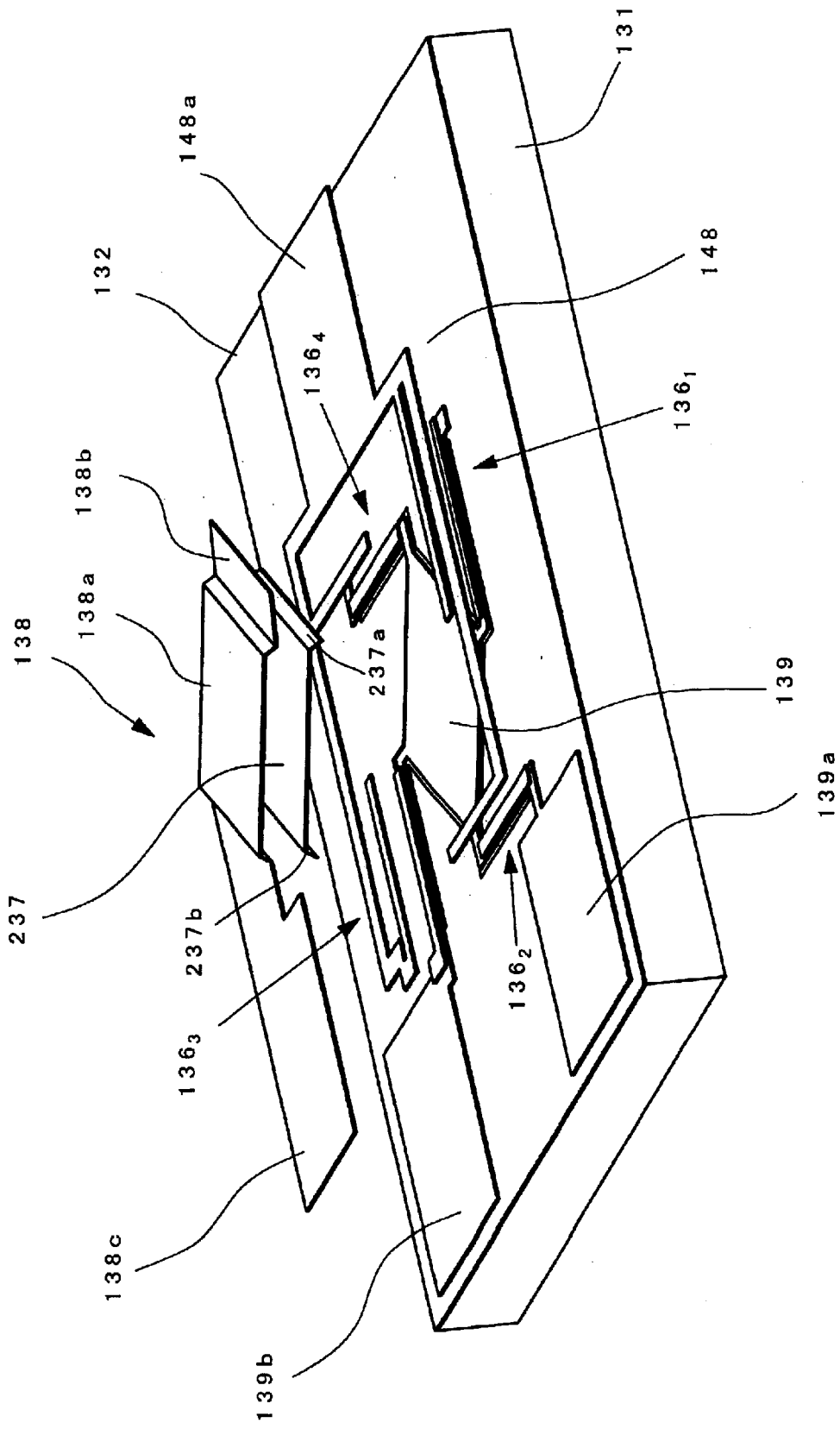
FIG. 30 is an exploded perspective view of a tunable capacitor according to an eighth embodiment of the present invention.
Figure 31:
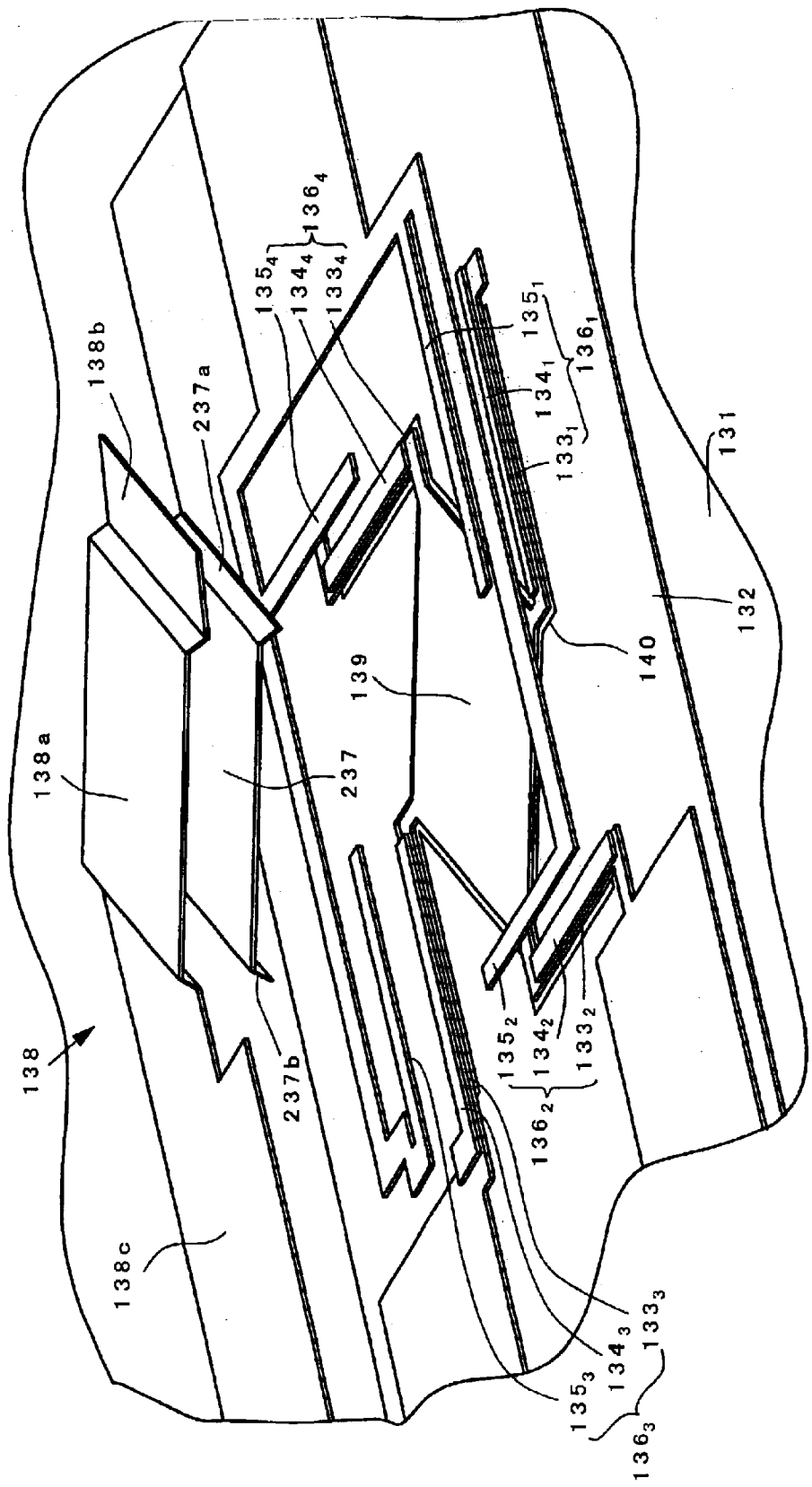
FIG. 31 is an enlarged perspective view of a part of the tunable capacitor shown in FIG. 30.

FIG. 30 is an exploded perspective view of a tunable capacitor according to an eighth embodiment of the present invention, and FIG. 31 is an enlarged perspective view of a part of the tunable capacitor shown in FIG. 30. In these figures, parts that are the same as those shown in FIGS. 23 through 25 are given the same reference numerals as previously.

The tunable capacitor includes a dielectric layer 237 in addition to the aforementioned substrate 131, four piezoelectric actuators $136_1$–$136_4$, movable electrode 139 and stationary electrode 138. The structure of the dielectric layer 237 differs from that of the dielectric layer 137 employed in the sixth embodiment of the present invention. The dielectric layer 237 bridges the movable electrode 139 like the bridge part 138a of the stationary electrode 138. The dielectric layer 237 has support portions 237a and 237b along two opposing sides. The support portions 237a and 237b are provided on the substrate 131 and supported thereby. The support portions 237a and 237b reinforce the strength of the bridge portion 138a.

FIGS. 32E through 32J illustrate a method of fabricating the tunable capacitor shown in FIGS. 30 and 31. The step of FIG. 32E follows that of FIG. 5D. The piezoelectric actuators are omitted from FIGS. 32E through 32J for the sake of simplicity. Further, a description of the process conditions and materials that have been described will be omitted here.

Figure 32E:
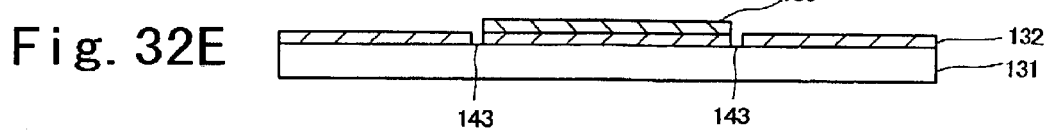
FIGS. 32E, 32F, 32G, 32H, 32I and 32J are cross-sectional views of a series of steps of a method of fabricating the tunable capacitor shown in FIG. 30.

As shown in FIG. 32E, the movable electrode 139 is provided on the insulation layer 132, which has the groove 143 defined by patterning. The movable electrode 139 is formed on an area on the insulation layer 132 surrounded by the groove 143.

Figure 32F:

Next, as shown in FIG. 32F, the sacrificial layer 144 is formed on the movable electrode 139. In this process, the sacrificial layer 144 is deposited in the groove 143.

Figure 32G:
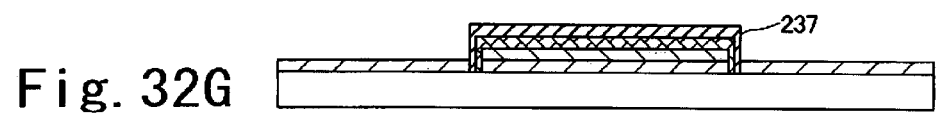

Then, as shown in FIG. 32G, the dielectric layer 237 is formed on the sacrificial layer 144. The side portions of the dielectric layer 237 enter into the groove 143 and contact the insulation layer 132.

Figure 32H:
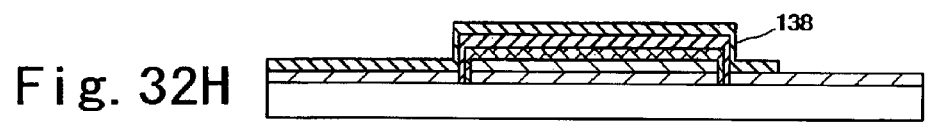

Thereafter, as shown in FIG. 32H, the stationary electrode 138 is formed on the dielectric layer 237 and the insulation layer 132.

Figure 32I:
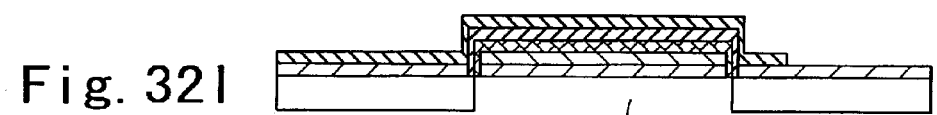

Then, as shown in FIG. 32I, the substrate 131 is etched so as to form the opening 140 below the movable electrode 139.

Figure 32J:
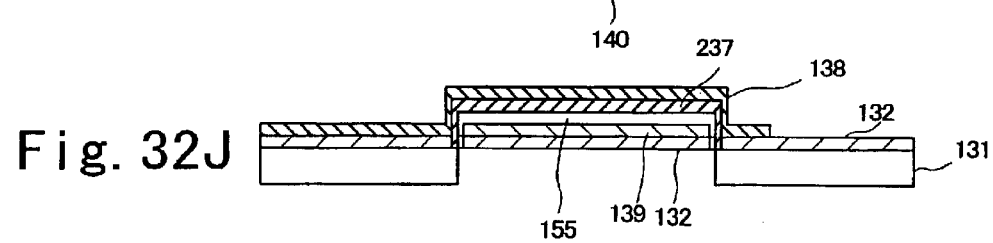

Finally, the sacrificial layer 144 is removed as shown in FIG. 32J.

In the processes of FIGS. 32G and 32H, it is preferable to form multiple etching holes such as those that have been described with reference to FIGS. 10G and 10H. The etching holes facilitate removal of the sacrificial layer 144 more efficiently and effectively in the process of FIG. 32J.

Ninth Embodiment

Figure 34:
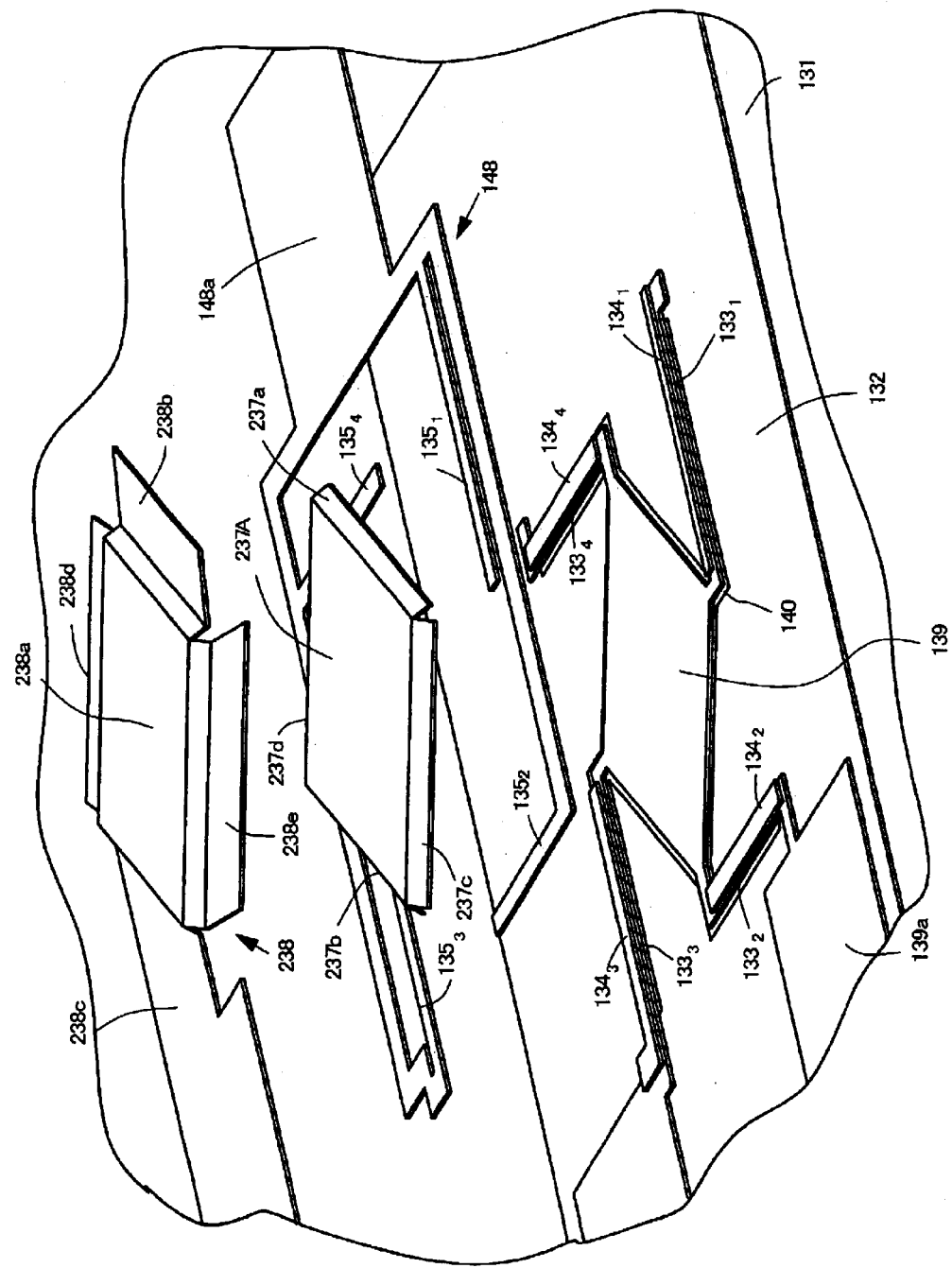
FIG. 34 is an enlarged perspective view of a part of the tunable capacitor shown in FIG. 33.

FIG. 33 is an exploded perspective view of a tunable capacitor according to a ninth embodiment of the present invention, and FIG. 34 is an enlarged perspective view of a part of the tunable capacitor shown in FIG. 33. In these figures, parts that are the same as those shown in FIGS. 27 through 29 are given the same reference numerals as previously.

The tunable capacitor includes a dielectric layer 237A and a stationary electrode 238 in addition to the aforementioned substrate 131, four piezoelectric actuators $136_1$–$136_4$ and movable electrode 139. The structure of the dielectric layer 237A differs from the dielectric layer 137 of the seventh embodiment and that of the dielectric layer 237 of the eighth embodiment. The dielectric layer 237A corresponds to a variation formed by adding support portions 237c and 237c to two sides of the dielectric layer 237. The dielectric layer 237A is supported on the substrate 131 in four locations and brides the movable electrode 139. Since both the stationary electrode 238 and the dielectric layer 238 are supported on the substrate 138 in four locations, the strength of the bridge portion can further be enhanced. The dielectric layer 237A may be varied so as to be supported in three or five locations or more.

Other Embodiments

The stationary electrodes employed in the aforementioned embodiments of the present invention have a single-layer structure. The stationary electrodes may have a multilayer structure. It will be noted that the residual stress in the thin film strongly depends on the method of forming the thin film and the deposition conditions. Thus, the residual stress in the stationary electrode can be relaxed by laminating a layer in which tension stress develops and another layer in which contraction stress develops in turn. This contributes to suppressing dispersion of the gap between the stationary electrode and the movable electrode.

FIGS. 35E through 35J illustrate a variation of the sixth embodiment of the present invention in which the stationary electrode 138 is composed of two layers $138_1$ and $138_2$. In the process of FIG. 35H, the two layers $138_1$ and $138_2$ are laminated in this order. The layers $138_1$ and $138_2$ may be conductive layers or a combination of conductive and insulation layers. Generally, tension stress is liable to develop in Cu, Al, Ti, Cr, Mo, Ni, Au or Pt, and contraction stress is liable to develop in $SiO_2$, $Al_2O_3$, Ru or Ta. The residual stress in the stationary electrode is relaxed as a whole by combining one or more tension stress based films and one or more contraction stress based films and changing the film thicknesses.

In the step of FIG. 35H, by way of example, Cu is deposited to a thickness of 1 μm and $SiO_2$ is deposited to a thickness of 0.3 μm with a power of 1 kV at a gas pressure of 0.64 Pa by the magnetron sputter apparatus.

Three layers or more may form the stationary electrode. In a case where the stationary electrode is composed of three layers, one of them may be a conductive layer and the remaining layers may be insulating layers. Anyway, it is important to appropriately combine multiple layers of different materials to thus reduce residual stress as a whole.

Even when the stationary electrode is formed by a single layer, residual stress can be relaxed as the whole bride portion including the dielectric layer attached thereto. For instance, when the stationary electrode 138 shown in FIG. 26 is made of Cu (tension stress) and the dielectric layer 137 is made of $Al_2O_3$ (contraction stress), the residual stress in the whole bridge portion can be relaxed.

The stationary electrodes employed in the first through ninth embodiments of the present invention may be a laminate of different layers as in the case shown in FIGS. 35A through 35J.

The stationary electrode of a laminate increases the thickness thereof, and an increased thickness reinforces the strength of the bridge portion. Further, the degree of selection of materials for the stationary electrode can be increased. Furthermore, the wiring resistance can be reduced and the Q value can be improved.

The present invention is not limited to the specifically disclosed embodiments and variations, but may include other embodiments, variations and modifications. For example, the piezoelectric actuators are driven so that the gap between the movable electrode and the dielectric layer (or stationary layer) is narrowed. Alternatively, the piezoelectric actuators may be configured and driven so that the gap between the movable electrode and the dielectric layer is widened (the electrostatic capacitance is reduced). In this case, the unimorph type piezoactuators shown in FIGS. 7A and 7B are varied so as to be distorted in the reverse direction. This may be achieved by polarizing the piezoelectric element in the reverse direction and inverting the polarities of the applied voltage V.

The tunable capacitors of the first through ninth embodiments of the present invention may be packaged with ceramics or any of other materials. External connection terminals provided on the package are connected to the pads on the substrate of the tunable capacitor by means of wires or bumps.

The present invention is based on Japanese Patent Application Nos. 2002-084600 and 2002-258559 filed on Mar. 25, 2002 and Sep. 4, 2002, and the entire disclosure of which is hereby incorporated by reference.

What is claimed is:

1. A tunable capacitor comprising:
    a substrate;
    a stationary electrode and a movable electrode supported by the substrate;
    piezoelectric actuators that are directly supported by the substrate and support corner portions of the movable electrode to drive the movable electrode, wherein the piezoelectric actuators have a longitudinal axis which is substantially parallel to a surface of the substrate that faces each of the stationary electrode and the movable electrode, the piezoelectric actuators extending along sides of the movable electrode; and
    a dielectric layer interposed between the stationary electrode and the movable electrode.

2. The tunable capacitor as claimed in claim 1, wherein the dielectric layer is supported by one of the stationary electrode and the movable electrode.

3. The tunable capacitor as claimed in claim 1, wherein the dielectric layer is attached to the stationary electrode, and faces the moveable electrode via an air layer.

4. The tunable capacitor as claimed in claim 3, wherein the dielectric layer is attached to the movable electrode, and faces the stationary electrode via an air layer.

5. The tunable capacitor as claimed in claim 1, wherein: the stationary electrode is provided on an insulation layer on the substrate; the dielectric layer is provided on the stationary electrode; and the moveable electrode faces the dielectric layer via an air layer.

6. The tunable capacitor as claimed in claim 1 wherein the stationary electrode is formed on an insulation layer on the substrate, and the dielectric layer is attached to the movable electrode and faces the stationary electrode via an air layer.

7. The tunable capacitor as claimed in claim 1, wherein the stationary electrode is supported by the substrate via an insulation layer on the substrate.

8. The tunable capacitor as claimed in claim 1, wherein the piezoelectric actuators are of unimorph type.

9. The tunable capacitor as claimed in claim 1, wherein the piezoelectric actuators are bimorph type.

10. The tunable capacitor as claimed in claim 1, wherein the stationary electrode and the movable electrodes have respective pads, which are provided on an insulation layer on the substrate.

11. The tunable capacitor as claimed in claim 1, wherein the stationary electrode has a multilayer structure that includes a first layer in which tension stress develops and a second layer in which contraction stress develops.

12. The tunable capacitor as claimed in claim 1, wherein the dielectric layer comprises any of beryllium oxide, aluminum oxide, aluminum nitride, barium titanate, magnesium titanate, titanium oxide, glass or silicon nitride.

13. The tunable capacitor as claimed in claim 1, wherein the piezoelectric actuators are provided by four.

14. The tunable capacitor as claimed in claim 1, wherein the piezoelectric actuators extend along the substantially whole lengths of the sides of the movable electrode.

15. A tunable capacitor comprising:
    a substrate;
    a stationary electrode and a movable electrode supported by the substrate;
    piezoelectric actuators that are directly supported by the substrate and drive the movable electrode, wherein the piezoelectric actuators have a longitudinal axis which is substantially parallel to a surface of the substrate that faces each of the stationary electrode and the movable electrode; and a dielectric layer interposed between the stationary electrode and the movable electrode, wherein each of the piezoelectric actuators includes a pair of electrodes and a piezoelectric element interposed therebetween, and is located in a space above the substrate.

16. A tunable capacitor comprising:

a substrate;

a stationary electrode and a movable electrode supported by the substrate;

piezoelectric actuators that are supported by the substrate and drive the movable electrode, wherein the piezoelectric actuators have a longitudinal axis which is substantially parallel to a surface of the substrate that faces each of the stationary electrode and the movable electrode; and a dielectric layer interposed between the stationary electrode and the movable electrode wherein each of the piezoelectric actuators includes a pair of electrodes and a piezoelectric element interposed therebetween, and is located in a space above the substrate, and wherein the pair of electrodes and the piezoelectric element are incorporated.

17. A tunable capacitor comprising:

a substrate;

a stationary electrode and a movable electrode supported by the substrate;

piezoelectric actuators that are directly supported by the substrate and drive the movable electrode; and a dielectric layer interposed between the stationary electrode and the movable electrode, wherein the stationary electrode has a bridge portion that bridges the moveable electrode, and the dielectric layer attached to the bridge portion faces the movable electrode via an air layer.

18. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the stationary electrode has a bridge portion that bridges the movable electrode, and the dielectric layer attached to the movable electrode and faces the stationary electrode via an air layer.

19. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein:

the piezoelectric actuators include drive elements, each of which includes a pair of electrodes and a piezoelectric element interposed therebetween;

the pair of electrodes includes a pad for an external connection; and the pad is provided on an insulation layer on the substrate.

20. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein each of the piezoelectric actuators has a respective pair of electrodes, and one of the electrodes of each of the piezoelectric actuators is commonly connected to the movable electrode.

21. A tunable capacitor comprising:

a substrate;

a stationary electrode and a movable electrode supported by the substrate;

piezoelectric actuators that are directly supported by the substrate and drive the movable electrode, wherein the piezoelectric actuators have a longitudinal axis which is substantially parallel to a surface of the substrate that faces each of the stationary electrode and the movable electrode; and a dielectric layer interposed between the stationary electrode and the movable electrode, wherein each of the piezoelectric actuators has a respective pair of electrodes, and one of the electrodes in each of the piezoelectric actuators in a separate electrode.

22. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the piezoelectric actuators have multiple common electrodes, each of which is one of a pair of electrodes in each of the piezoelectric actuators.

23. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the stationary electrode has a bridge portion that bridges the movable electrode, and the bridge portion has a shape approximately identical to that of the movable electrode and faces the moveable electrodes via the dielectric layer.

24. A tunable capacitor comprising:

a substrate;

a stationary electrode and a movable electrode supported by the substrate;

piezoelectric actuators that are directly supported by the substrate and drive the movable electrode; and a dielectric layer interposed between the stationary electrode and the movable electrode, wherein: the stationary electrode has a bridge portion that bridges the movable electrode; the bridge portion has a shape approximately identicle to that of the movable electrode and faces the movable electrode via the dielectric layer; and the stationary electrode has three or more support portions, which are provided on an insulation layer on the substrate.

25. A tunable capacitor comprising:

a substrate;

a stationary electrode and a movable electrode supported by the substrate;

piezoelectric actuators that are supported by the substrate and drive the movable electrode; and the bridge portion has a shape approximately identical to that of the moveable electrode and faces the moveable electrode via the dielectric layer; and the dielectric layer is attached to the stationary electrode and bridges the movable electrode.

26. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the movable electrode moves in a range from a first state in which an air layer exists between the dielectric layer and the stationary layer or between the dielectric layer and the moveable layer to a second state in which the stationary electrode, the dielectric electrode and the movable electrode are brought into contact.

27. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the dielectric layer is attached to the stationary electrode, and the dielectric layer and the stationary electrode have through holes that are penetrated therethrough.

28. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the dielectric layer is attached to the stationary electrode, and the movable electrode has through holes that are penetraded therethrough.

29. A tunable capactor comprising:

a substrate;

a stationary electrode and a movable electrode supported by the substrate;

piezoelectric actuators that are supported by the substrate and drive the moveable electrode; and a dielectric layer interposed between the stationary electrode and the movable electrode, wherein the substrate has an opening, and the stationary electrode, the movable electrobe, the dielectric layer and the piezoelectric actuators are provided above the opening.

30. A tunable capacitor comprising:

a substrate;

a stationary electrode and a movable electrode supported by the substrate;

piezoelectric actuators that are supported by the substrate and drive the movable electrode; and a dielectric layer interposed between the stationary electrode and the movable electrode, wherein the substrate has an opening, and the tunable capacitor comprises an insulation layer that bridges the opening.

* * * * *